United States Patent
Chawla et al.

(10) Patent No.: US 11,303,646 B2
(45) Date of Patent: Apr. 12, 2022

(54) DYNAMIC MEMBERSHIP ASSIGNMENT TO USERS USING DYNAMIC RULES

(71) Applicant: Oracle International Corporation, Redwood Shores, CA (US)

(72) Inventors: Isha Chawla, New Delhi (IN); Ashish Bhargava, Ghaziabad (IN)

(73) Assignee: Oracle International Corporation, Redwood Shores, CA (US)

( * ) Notice: Subject to any disclaimer, the term of this patent is extended or adjusted under 35 U.S.C. 154(b) by 134 days.

(21) Appl. No.: 16/820,424

(22) Filed: Mar. 16, 2020

(65) Prior Publication Data
US 2021/0288970 A1 Sep. 16, 2021

(51) Int. Cl.
*H04L 29/06* (2006.01)
*H04L 67/562* (2022.01)

(52) U.S. Cl.
CPC .......... *H04L 63/104* (2013.01); *H04L 63/102* (2013.01); *H04L 63/20* (2013.01); *H04L 67/2809* (2013.01)

(58) Field of Classification Search
CPC ...... H04L 63/104; H04L 63/102; H04L 63/20
See application file for complete search history.

(56) References Cited

U.S. PATENT DOCUMENTS

| | | | |
|---|---|---|---|
| 6,671,695 B2 | 12/2003 | McFadden | |
| 7,099,932 B1 * | 8/2006 | Frenkel | H04L 29/12009 709/220 |
| 8,606,832 B2 | 12/2013 | Rowley | |
| 8,868,651 B2 | 10/2014 | Roman et al. | |
| 8,955,151 B2 | 2/2015 | Pugh | |
| 9,577,891 B1 * | 2/2017 | Avery | H04L 41/50 |
| 9,800,584 B1 * | 10/2017 | Andruschuk | H04L 63/104 |
| 10,216,949 B1 | 2/2019 | McKelvie et al. | |
| 2002/0129135 A1 * | 9/2002 | Delany | H04L 63/105 709/223 |
| 2002/0138572 A1 * | 9/2002 | Delany | G06F 21/41 709/204 |
| 2003/0126137 A1 * | 7/2003 | McFadden | G06F 16/288 |
| 2004/0006594 A1 * | 1/2004 | Boyer | G06F 21/6218 709/204 |

(Continued)

OTHER PUBLICATIONS

Dynamic Membership Rules for Groups in Azure Active Directory, Available Online at https://docs.microsoft.com/en-us/azure/active-directory/users-groups-roles/groups-dynamic-membership, Oct. 9, 2019, 16 pages.

(Continued)

*Primary Examiner* — Jason Chiang
(74) *Attorney, Agent, or Firm* — Kilpatrick Townsend & Stockton LLP

(57) ABSTRACT

Techniques for identity management, and more particularly, to techniques for dynamically assigning membership to users in the system based on dynamic rules. In one aspect a computer-implement method is provided that breaks down the processing from a single large thread or operation into multiple minutest level threads or operations and makes use of event driven architecture used in distributed environments such as a cloud environment, to achieve a scalable model and can work seamlessly for multi-tenant applications. Every sub problem is assigned to a dedicated set of subscribers on a messaging service for processing.

20 Claims, 8 Drawing Sheets

(56) References Cited

U.S. PATENT DOCUMENTS

| | | | |
|---|---|---|---|
| 2005/0060572 A1* | 3/2005 | Kung | G06F 21/604 726/4 |
| 2005/0114478 A1 | 5/2005 | Popescu et al. | |
| 2005/0257245 A1* | 11/2005 | Patrick | H04L 63/20 726/1 |
| 2006/0218147 A1* | 9/2006 | Shrivastava | H04L 12/185 |
| 2007/0168530 A1* | 7/2007 | Delaney | G06F 21/31 709/229 |
| 2010/0067390 A1* | 3/2010 | Pereira Valente | H04L 41/22 370/252 |
| 2010/0162260 A1* | 6/2010 | Ibrahim | G06F 9/505 718/105 |
| 2010/0241599 A1* | 9/2010 | Yu | G06Q 10/00 706/20 |
| 2011/0071972 A1* | 3/2011 | Zmolek | G06Q 10/10 706/47 |
| 2012/0084669 A1* | 4/2012 | Flint | G06Q 10/10 715/753 |
| 2013/0191394 A1* | 7/2013 | Bradley | G06F 16/9535 707/738 |
| 2013/0205215 A1* | 8/2013 | Dunn | G06Q 50/01 715/738 |
| 2014/0181801 A1* | 6/2014 | Voronkov | G06F 8/63 717/177 |
| 2014/0359104 A1* | 12/2014 | Xu | H04W 4/08 709/223 |
| 2015/0128224 A1* | 5/2015 | Lloyd | H04L 63/102 726/4 |
| 2018/0041378 A1* | 2/2018 | Yan | H04L 41/0631 |
| 2019/0286462 A1* | 9/2019 | Bodnick | G06F 40/143 |
| 2020/0004785 A1* | 1/2020 | Tian | H04L 12/1822 |
| 2021/0029173 A1* | 1/2021 | Deb | H04L 63/20 |

OTHER PUBLICATIONS

Learn People Soft Security, Available Online at http://www.learnpeoplesoftsecurity.com/function-security-roles/dynamic-roles/, Oct. 10, 2019, 6 pages.

The Magic of Dynamic Groups, Available Online at https://blogs.technet.microsoft.com/smeems/2018/02/01/dynamic-aad-groups/, Feb. 1, 2018, 5 pages.

* cited by examiner

DYNAMIC MEMBERSHIP ASSIGNMENT TO USERS USING DYNAMIC RULES

FIELD OF THE INVENTION

The present disclosure relates generally to identity management, and more particularly, to techniques for dynamically assigning membership to users in the system based on dynamic rules.

BACKGROUND

A modern enterprise has a large number of applications both on-premises and in cloud, that are used by employees, contractors, partners and end-consumers. Each user has certain privileges within these applications that dictates what they are allowed to do in these applications. The sum total of all privileges that all users of these system have forms the overall surface area for risk management and compliance. Excess privileges and toxic combinations of privileges can lead to compliance violation.

Identity management attempts to keep enterprises in charge of the privilege foot print by controlling information about their users. The information may be controlled by defining and managing the roles and access privileges of individual network users and the circumstances in which users are granted (or denied) those privileges. Those users might be customers (customer identity management) or employees (employee identity management). The core objective of an identity management system is to maintain is one digital identity per individual. Once that digital identity has been established, it must be maintained, modified and monitored throughout each user's access life cycle. Thus, the primary goal of identity management is to grant access to the right enterprise assets to the right users in the right context throughout the access lifecycle—from a user's system onboarding to permission authorizations to the off boarding of that user as needed.

In order to support these and other life cycle management operations for various identity and access related entities, an identity management system typically provides administrators with the tools and technologies to change a user's role, track user activities, create reports on those activities, and enforce policies on an ongoing basis. These systems are designed to provide a means of administering user access across an entire enterprise and to ensure compliance with corporate policies and government regulation.

BRIEF SUMMARY

Techniques are provided (e.g., a method, a system, non-transitory computer-readable medium storing code or instructions executable by one or more processors) for dynamically assigning and/or unassigning membership to users in the system based on dynamic rules.

In various embodiments, a method is provided that comprises: publishing, at a data processing system, a first message for a first type of event, wherein the first type of event comprises a request to identify and fetch users for a group based on a rule; obtaining, by a first subscriber of the data processing system, the first message; fetching, by the first subscriber of the data processing system, a plurality of user identifiers associated with a plurality of the users that satisfy the rule; identifying, by the first subscriber of the data processing system, a first group of user identifiers of the plurality of user identifiers based on a first configurable property; splitting, by the first subscriber of the data processing system, the first group of user identifiers into subgroups of user identifiers based on a second configurable property, wherein the subgroups of user identifiers comprise a first subgroup of user identifiers and a second subgroup of user identifiers; publishing, by the first subscriber of the data processing system, a second message for a second type of event for each subgroup of the first group of user identifiers, wherein the second type of event comprises a request to add the subgroup of user identifiers to the group; obtaining, by a second subscriber of the data processing system, the second message for the first subgroup of user identifiers; adding, by a second subscriber of the data processing system, the first subgroup of user identifiers to the group to assign group membership to a first subgroup of the users associated with the first subgroup of user identifiers; obtaining, by a third subscriber of the data processing system, the second message for the second subgroup of user identifiers; and adding, by a third subscriber of the data processing system, the second subgroup of user identifiers to the group to assign group membership to a second subgroup of the users associated with the second subgroup of user identifiers.

In some embodiments, the method further comprises: obtaining, by the second subscriber of the data processing system, the second message; and adding, by the second subscriber of the data processing system, a third subgroup of user identifiers to the group to assign group membership to a third subgroup of the users associated with the third subgroup of user identifiers, wherein the adding the first subgroup of user identifiers to the group and the adding the second subgroup of user identifiers to the group are performed simultaneously or serially.

In some embodiments, the method further comprises: retaining, by the first subscriber of the data processing system, a user identifier for the last user in the first group of user identifiers; republishing, by the first subscriber of the data processing system, the first message for the first type of event, wherein the first message is republished with the user identifier for the last user in the first group of user identifiers to maintain state for processing of additional groups of user identifiers; and obtaining, by a fourth subscriber of the data processing system, the first message, wherein the fourth subscriber is a same or different subscriber as the first subscriber.

In some embodiments, the method further comprises: upon obtaining the first message, validating, by the first the subscriber, the rule for the group, wherein the validating comprises determining whether the rule has been removed or modified for the group; and when the rule has been removed or modified for the group, stopping processing of the first message.

In some embodiments, the method further comprises: upon obtaining the first message, validating, by the first the subscriber, the first message, wherein the validating comprises determining whether the rule has been removed or modified for the group; and when the rule has not been removed or modified for the group, fetching, by the fourth subscriber of the data processing system, a plurality of user identifiers associated with a plurality of the users that satisfy the rule; identifying, by the fourth subscriber of the data processing system, a second group of user identifiers of the plurality of user identifiers based on the first configurable property and the user identifier for the last user in the first group of user identifiers; splitting, by the fourth subscriber of the data processing system, the second group of user identifiers into subgroups of user identifiers based on the second configurable property; and publishing, by the fourth subscriber of the data processing system, the second message for the second type of event for each subgroup of the second group of user identifiers.

In some embodiments, the method further comprises: publishing, at the data processing system, a third message for a third type of event, wherein the third type of event comprises a request to identify and fetch users for the group that are not already part of the group based on a new; obtaining, by a fifth subscriber of the data processing system, the third message; fetching, by the fifth subscriber of the data processing system, one or more user identifiers associated with one or more users that have been assigned group membership to the group that do not satisfy the new rule; identifying, by the fifth subscriber of the data processing system, a second group of user identifiers of the one or more user identifiers based on the first configurable property; splitting, by the fifth subscriber of the data processing system, the second group of user identifiers into subgroups of user identifiers based on the second configurable property, wherein the subgroups of user identifiers comprise a third subgroup of user identifiers and a fourth subgroup of user identifiers; publishing, by the fifth subscriber of the data processing system, a fourth message for a fourth type of event for each subgroup of the second group of user identifiers, wherein the fourth type of event comprises a request to remove the subgroup of user identifiers from the group; obtaining, by a sixth subscriber of the data processing system, the fourth message for the third subgroup of user identifiers; removing, by the sixth subscriber of the data processing system, the third subgroup of user identifiers from the group to remove assignment of group membership from a third subgroup of the one or more users associated with the third subgroup of user identifiers; obtaining, by a seventh subscriber of the data processing system, the fourth message for the fourth subgroup of user identifiers; and removing, by the seventh subscriber of the data processing system, the fourth subgroup of user identifiers from the group to remove assignment of group membership from a fourth subgroup of the one or more users associated with the fourth subgroup of user identifiers.

In some embodiments, the method further comprises: fetching, by the fifth subscriber of the data processing system, a one or more user identifiers associated with one or more users that satisfy the new rule; identifying, by the fifth subscriber of the data processing system, a third group of user identifiers of the one or more user identifiers based on the first configurable property; splitting, by the fifth subscriber of the data processing system, the third group of user identifiers into subgroups of user identifiers based on the second configurable property, wherein the subgroups of user identifiers comprise a fifth subgroup of user identifiers and a sixth subgroup of user identifiers; publishing, by the fifth subscriber of the data processing system, the second message for the second type of event for each subgroup of the third group of user identifiers; obtaining, by a eighth subscriber of the data processing system, the second message for the fifth subgroup of user identifiers; adding, by a eighth subscriber of the data processing system, the fifth subgroup of user identifiers to the group to assign group membership to a fifth subgroup of the users associated with the fifth subgroup of user identifiers; obtaining, by a ninth subscriber of the data processing system, the second message for the sixth subgroup of user identifiers; and adding, by the ninth subscriber of the data processing system, the sixth subgroup of user identifiers to the group to assign group membership to a sixth subgroup of the users associated with the sixth subgroup of user identifiers.

In various embodiments, a non-transitory computer-readable memory is provided for that stores a plurality of instructions executable by one or more processors, the plurality of instructions comprising instructions that when executed by the one or more processors cause the one or more processors to perform processing comprising: publishing, at a data processing system, a first message for a first type of event, wherein the first type of event comprises a request to identify and fetch users for a group based on a rule; obtaining, by a first subscriber of the data processing system, the first message; fetching, by the first subscriber of the data processing system, a plurality of user identifiers associated with a plurality of the users that satisfy the rule; identifying, by the first subscriber of the data processing system, a first group of user identifiers of the plurality of user identifiers based on a first configurable property; splitting, by the first subscriber of the data processing system, the first group of user identifiers into subgroups of user identifiers based on a second configurable property, wherein the subgroups of user identifiers comprise a first subgroup of user identifiers and a second subgroup of user identifiers; publishing, by the first subscriber of the data processing system, a second message for a second type of event for each subgroup of the first group of user identifiers, wherein the second type of event comprises a request to add the subgroup of user identifiers to the group; obtaining, by a second subscriber of the data processing system, the second message for the first subgroup of user identifiers; adding, by a second subscriber of the data processing system, the first subgroup of user identifiers to the group to assign group membership to a first subgroup of the users associated with the first subgroup of user identifiers; obtaining, by a third subscriber of the data processing system, the second message for the second subgroup of user identifiers; and adding, by a third subscriber of the data processing system, the second subgroup of user identifiers to the group to assign group membership to a second subgroup of the users associated with the second subgroup of user identifiers.

In some embodiments, the processing further comprises: obtaining, by the second subscriber of the data processing system, the second message; and adding, by the second subscriber of the data processing system, a third subgroup of user identifiers to the group to assign group membership to a third subgroup of the users associated with the third subgroup of user identifiers, wherein the adding the first subgroup of user identifiers to the group and the adding the second subgroup of user identifiers to the group are performed simultaneously or serially.

In some embodiments, the processing further comprises: retaining, by the first subscriber of the data processing system, a user identifier for the last user in the first group of user identifiers; republishing, by the first subscriber of the data processing system, the first message for the first type of event, wherein the first message is republished with the user identifier for the last user in the first group of user identifiers to maintain state for processing of additional groups of user identifiers; and obtaining, by a fourth subscriber of the data processing system, the first message, wherein the fourth subscriber is a same or different subscriber as the first subscriber.

In some embodiments, the processing further comprises: upon obtaining the first message, validating, by the first the subscriber, the rule for the group, wherein the validating comprises determining whether the rule has been removed or modified for the group; and when the rule has been removed or modified for the group, stopping processing of the first message.

In some embodiments, the processing further comprises: upon obtaining the first message, validating, by the first the subscriber, the first message, wherein the validating comprises determining whether the rule has been removed or modified for the group; and when the rule has not been removed or modified for the group, fetching, by the fourth subscriber of the data processing system, a plurality of user identifiers associated with a plurality of the users that satisfy the rule; identifying, by the fourth subscriber of the data processing system, a second group of user identifiers of the plurality of user identifiers based on the first configurable property and the user identifier for the last user in the first group of user identifiers; splitting, by the fourth subscriber of the data processing system, the second group of user identifiers into subgroups of user identifiers based on the second configurable property; and publishing, by the fourth subscriber of the data processing system, the second message for the second type of event for each subgroup of the second group of user identifiers.

In some embodiments, the processing further comprises: publishing, at the data processing system, a third message for a third type of event, wherein the third type of event comprises a request to identify and fetch users for the group that are not already part of the group based on a new rule; obtaining, by a fifth subscriber of the data processing system, the third message; fetching, by the fifth subscriber of the data processing system, one or more user identifiers associated with one or more users that have been assigned group membership to the group that do not satisfy the new rule; identifying, by the fifth subscriber of the data processing system, a second group of user identifiers of the one or more user identifiers based on the first configurable property; splitting, by the fifth subscriber of the data processing system, the second group of user identifiers into subgroups of user identifiers based on the second configurable property, wherein the subgroups of user identifiers comprise a third subgroup of user identifiers and a fourth subgroup of user identifiers; publishing, by the fifth subscriber of the data processing system, a fourth message for a fourth type of event for each subgroup of the second group of user identifiers, wherein the fourth type of event comprises a request to remove the subgroup of user identifiers from the group; obtaining, by a sixth subscriber of the data processing system, the fourth message for the third subgroup of user identifiers; removing, by the sixth subscriber of the data processing system, the third subgroup of user identifiers from the group to remove assignment of group membership from a third subgroup of the one or more users associated with the third subgroup of user identifiers; obtaining, by a seventh subscriber of the data processing system, the fourth message for the fourth subgroup of user identifiers; and removing, by the seventh subscriber of the data processing system, the fourth subgroup of user identifiers from the group to remove assignment of group membership from a fourth subgroup of the one or more users associated with the fourth subgroup of user identifiers.

In some embodiments, the processing further comprises: fetching, by the fifth subscriber of the data processing system, a one or more user identifiers associated with one or more users that satisfy the new rule; identifying, by the fifth subscriber of the data processing system, a third group of user identifiers of the one or more user identifiers based on the first configurable property; splitting, by the fifth subscriber of the data processing system, the third group of user identifiers into subgroups of user identifiers based on the second configurable property, wherein the subgroups of user identifiers comprise a fifth subgroup of user identifiers and a sixth subgroup of user identifiers; publishing, by the fifth subscriber of the data processing system, the second message for the second type of event for each subgroup of the third group of user identifiers; obtaining, by a eighth subscriber of the data processing system, the second message for the fifth subgroup of user identifiers; adding, by a eighth subscriber of the data processing system, the fifth subgroup of user identifiers to the group to assign group membership to a fifth subgroup of the users associated with the fifth subgroup of user identifiers; obtaining, by a ninth subscriber of the data processing system, the second message for the sixth subgroup of user identifiers; and adding, by the ninth subscriber of the data processing system, the sixth subgroup of user identifiers to the group to assign group membership to a sixth subgroup of the users associated with the sixth subgroup of user identifiers.

In various embodiments, a system is provided that comprises: one or more processors; and a memory coupled to the one or more processors, the memory storing a plurality of instructions executable by the one or more processors, the plurality of instructions comprising instructions that when executed by the one or more processors cause the one or more processors to perform processing comprising: publishing, at a data processing system, a first message for a first type of event, wherein the first type of event comprises a request to identify and fetch users for a group based on a rule; obtaining, by a first subscriber of the data processing system, the first message; fetching, by the first subscriber of the data processing system, a plurality of user identifiers associated with a plurality of the users that satisfy the rule; identifying, by the first subscriber of the data processing system, a first group of user identifiers of the plurality of user identifiers based on a first configurable property; splitting, by the first subscriber of the data processing system, the first group of user identifiers into subgroups of user identifiers based on a second configurable property, wherein the subgroups of user identifiers comprise a first subgroup of user identifiers and a second subgroup of user identifiers; publishing, by the first subscriber of the data processing system, a second message for a second type of event for each subgroup of the first group of user identifiers, wherein the second type of event comprises a request to add the subgroup of user identifiers to the group; obtaining, by a second subscriber of the data processing system, the second message for the first subgroup of user identifiers; adding, by a second subscriber of the data processing system, the first subgroup of user identifiers to the group to assign group membership to a first subgroup of the users associated with the first subgroup of user identifiers; obtaining, by a third subscriber of the data processing system, the second message for the second subgroup of user identifiers; and adding, by a third subscriber of the data processing system, the second subgroup of user identifiers to the group to assign group membership to a second subgroup of the users associated with the second subgroup of user identifiers.

In some embodiments, the processing further comprises: retaining, by the first subscriber of the data processing system, a user identifier for the last user in the first group of user identifiers; republishing, by the first subscriber of the data processing system, the first message for the first type of event, wherein the first message is republished with the user identifier for the last user in the first group of user identifiers to maintain state for processing of additional groups of user identifiers; and obtaining, by a fourth subscriber of the data processing system, the first message, wherein the fourth subscriber is a same or different subscriber as the first subscriber.

In some embodiments, the processing further comprises: upon obtaining the first message, validating, by the first the subscriber, the rule for the group, wherein the validating comprises determining whether the rule has been removed or modified for the group; and when the rule has been removed or modified for the group, stopping processing of the first message.

In some embodiments, the processing further comprises: upon obtaining the first message, validating, by the first the subscriber, the first message, wherein the validating comprises determining whether the rule has been removed or modified for the group; and when the rule has not been removed or modified for the group, fetching, by the fourth subscriber of the data processing system, a plurality of user identifiers associated with a plurality of the users that satisfy the rule; identifying, by the fourth subscriber of the data processing system, a second group of user identifiers of the plurality of user identifiers based on the first configurable property and the user identifier for the last user in the first group of user identifiers; splitting, by the fourth subscriber of the data processing system, the second group of user identifiers into subgroups of user identifiers based on the second configurable property; and publishing, by the fourth subscriber of the data processing system, the second message for the second type of event for each subgroup of the second group of user identifiers.

In some embodiments, the processing further comprises: publishing, at the data processing system, a third message for a third type of event, wherein the third type of event comprises a request to identify and fetch users for the group that are not already part of the group based on a new rule; obtaining, by a fifth subscriber of the data processing system, the third message; fetching, by the fifth subscriber of the data processing system, one or more user identifiers associated with one or more users that have been assigned group membership to the group that do not satisfy the new rule; identifying, by the fifth subscriber of the data processing system, a second group of user identifiers of the one or more user identifiers based on the first configurable property; splitting, by the fifth subscriber of the data processing system, the second group of user identifiers into subgroups of user identifiers based on the second configurable property, wherein the subgroups of user identifiers comprise a third subgroup of user identifiers and a fourth subgroup of user identifiers; publishing, by the fifth subscriber of the data processing system, a fourth message for a fourth type of event for each subgroup of the second group of user identifiers, wherein the fourth type of event comprises a request to remove the subgroup of user identifiers from the group; obtaining, by a sixth subscriber of the data processing system, the fourth message for the third subgroup of user identifiers; removing, by the sixth subscriber of the data processing system, the third subgroup of user identifiers from the group to remove assignment of group membership from a third subgroup of the one or more users associated with the third subgroup of user identifiers; obtaining, by a seventh subscriber of the data processing system, the fourth message for the fourth subgroup of user identifiers; and removing, by the seventh subscriber of the data processing system, the fourth subgroup of user identifiers from the group to remove assignment of group membership from a fourth subgroup of the one or more users associated with the fourth subgroup of user identifiers.

In some embodiments, the processing further comprises: fetching, by the fifth subscriber of the data processing system, a one or more user identifiers associated with one or more users that satisfy the new rule; identifying, by the fifth subscriber of the data processing system, a third group of user identifiers of the one or more user identifiers based on the first configurable property; splitting, by the fifth subscriber of the data processing system, the third group of user identifiers into subgroups of user identifiers based on the second configurable property, wherein the subgroups of user identifiers comprise a fifth subgroup of user identifiers and a sixth subgroup of user identifiers; publishing, by the fifth subscriber of the data processing system, the second message for the second type of event for each subgroup of the third group of user identifiers; obtaining, by an eighth subscriber of the data processing system, the second message for the fifth subgroup of user identifiers; adding, by an eighth subscriber of the data processing system, the fifth subgroup of user identifiers to the group to assign group membership to a fifth subgroup of the users associated with the fifth subgroup of user identifiers; obtaining, by a ninth subscriber of the data processing system, the second message for the sixth subgroup of user identifiers; and adding, by the ninth subscriber of the data processing system, the sixth subgroup of user identifiers to the group to assign group membership to a sixth subgroup of the users associated with the sixth subgroup of user identifiers.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

Figure 1:
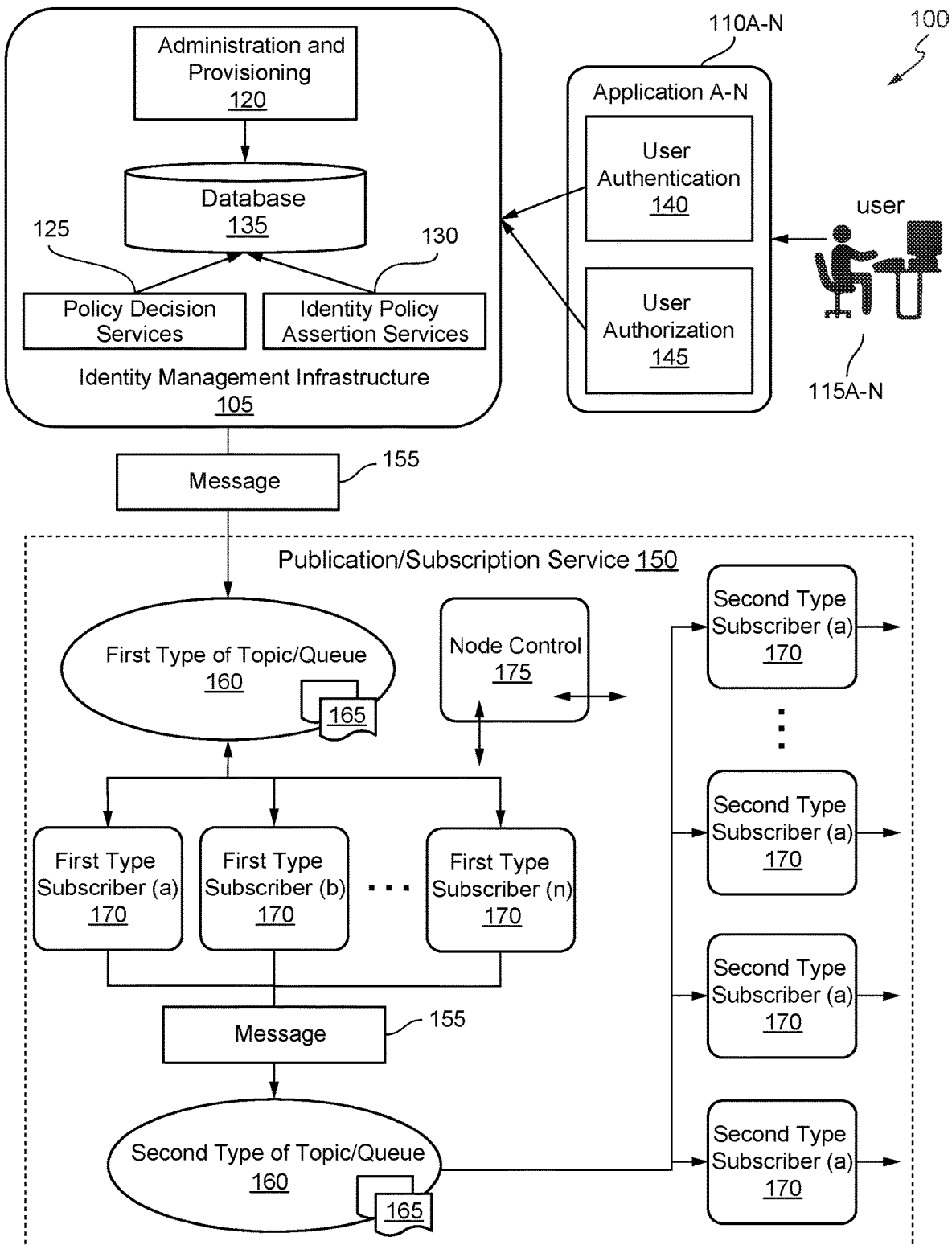
FIG. 1 shows a block diagram for an approach to lifecycle management in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Introduction

Conventional identity management systems implement use user groups to create and manage the records of a collection of users to whom an end user (e.g., an administrator for an enterprise) wants to permit access to common functionality, such as access rights, roles, or permissions. User groups can be independent of an enterprise, span multiple enterprises, or contain users from a single enterprise. Groups are typically created with one or more membership rules or policies that identify users that qualify for membership in the groups. For example, when a group is created with membership rule, all the users present in a system which meet the membership rule criterion are made part of the group. This avoids manually adding users to groups to determine application or resource assignments. The traditional way of solving this problem is to fetch all the users which meet the group's membership rule and keep on assigning them to the group with the help of a single job thread or a PL/SQL stores procedure.

However, this conventional approach for assignment of group membership is not scalable and not possible in a distributed environment such as the cloud environment. For example, when a group is created with a membership rule and 1 million users present in the system satisfy this group's rule criterion, then a single job thread or a PL/SQL stores procedure needs to assign this group's membership to these 1 million users. This causes a processing node of the identity management system to become blocked with this single job thread or a PL/SQL stores procedure for an extended period of time while other processing nodes remain idle (waste of resources). This blockage with this single job thread or a PL/SQL stores procedure also results in slower response time of other requests waiting for this one lengthy thread or operation to be completed.

Accordingly, a different approach is needed to address these problems. In various embodiments, a different approach is provided for assignment of group membership. This approach breaks down the processing from a single large thread or operation into multiple minutest level threads or operations and makes use of event driven architecture used in distributed environments such as a cloud environment, so that the approach a scalable model and can work seamlessly for multi-tenant applications. Every sub problem is assigned to a dedicated set of subscribers on a messaging service. Performance is constant even in case of peak load because virtual machines can be added dynamically as part of auto scaling. The steps of the approach in a life cycle use case such as dynamic membership assignment include publishing a first event in a messaging queue for creation of a new group having a membership rule, a first subscriber receiving the first event and identifying all users that satisfy the membership rule, the first subscriber splits a portion of the users into subgroups of users based on predefined criteria, the first subscriber then assigns each subgroup of users to a second event creating a plurality of second events and publishes the second events in the messaging queue, each second subscriber of a plurality of second subscribers receives one or more of the second events and assigns group membership to all users in each subgroup associated with the one or more of the second events, and the first subscriber republishes the first event in the messaging queue for creation of the new group to initiate the processing for another portion of the users and this approach continues until all users that satisfy the membership rule have been assigned to the group.

In one illustrative embodiment, a computer implemented method is provided that comprises: publishing, at a data processing system, a first message for a first type of event, where the first type of event comprises a request to identify and fetch users for a group based on a rule; obtaining, by a first subscriber of the data processing system, the first message; fetching, by the first subscriber of the data processing system, a plurality of user identifiers associated with a plurality of the users that satisfy the rule; identifying, by the first subscriber of the data processing system, a first group of user identifiers of the plurality of user identifiers based on a first configurable property; splitting, by the first subscriber of the data processing system, the first group of user identifiers into subgroups of user identifiers based on a second configurable property, where the subgroups of user identifiers comprise a first subgroup of user identifiers and a second subgroup of user identifiers; publishing, by the first subscriber of the data processing system, a second message for a second type of event for each subgroup of the first group of user identifiers, where the second type of event comprises a request to add the subgroup of user identifiers to the group; obtaining, by a second subscriber of the data processing system, the second message for the first subgroup of user identifiers; adding, by a second subscriber of the data processing system, the first subgroup of user identifiers to the group to assign group membership to a first subgroup of the users associated with the first subgroup of user identifiers; obtaining, by a third subscriber of the data processing system, the second message for the second subgroup of user identifiers; and adding, by a third subscriber of the data processing system, the second subgroup of user identifiers to the group to assign group membership to a second subgroup of the users associated with the second subgroup of user identifiers.

Advantageously, this multi-subscriber/node approach utilizes the identity management system to its maximum capacity and take the advantage of scaling which is provided by a distributed cloud platform as the complete life cycle is broken into multiple steps. These smaller steps can be executed by subscriber on any available server in comparison to it being processed by a single subscriber on a single server. This eventually results in better process timing as well. If work is not split, even in a messaging server of a distributed cloud platform, the long running task will timeout. In multi-tenant application the resources and work are distributed across tenants. Otherwise one tenant might end up consuming all the resources and others will starve for the resources.

It should be understood this approach can be utilized anywhere in the industry for bulk processing where the lifecycle can be broken down into smaller steps, leading to high availability of system and better performance can be achieved by scaling the system as and when load increases. Moreover, since the work is evaluated in stages, it would also avoid the problem of thread time-out.

Identity Management Framework

In various embodiments, an identity management (IDM) system is provided that is implemented in a cloud computing environment and that may be partitioned into multiple separate identity domains. In some embodiments, a set of constructs all align together to create an abstraction of, or "tenant-sliced" view of, a single IDM system. This single IDM system can include multiple separate components or sub-systems. The IDM system can be shared among multiple independent and separate "tenants," or IDM system customers, so that the IDM system is more densely utilized. Thus, there is no need for a separate IDM system to be instantiated for each separate customer. The single IDM system can be configured such that, for each tenant of the IDM system, a virtual view of the IDM system that is specific to that tenant can be presented to that tenant's users.

In some embodiments, techniques are provided for automating the provisioning, managing and tracking of services provided by a cloud infrastructure system. A cloud infrastructure system may provide many capabilities including, but not limited to, provisioning, managing and tracking a customer's subscription for services and resources in the cloud infrastructure system, providing predictable operating expenses to customers utilizing the services in the cloud infrastructure system, providing robust identity domain separation and protection of a customer's data in the cloud infrastructure system, providing customers with a transparent architecture and control of the design of the cloud infrastructure system, providing customers assured data protection and compliance with data privacy standards and regulations, providing customers with an integrated development experience for building and deploying services in the cloud infrastructure system and providing customers with a seamless integration between business software, middleware, database and infrastructure services in the cloud infrastructure system.

In certain embodiments, services provided by the cloud infrastructure system may include a host of services that are made available to users of the cloud infrastructure system on demand such as online data storage and backup solutions, Web-based e-mail services, hosted office suites and document collaboration services, database processing, managed technical support services and the like. Services provided by the cloud infrastructure system can dynamically scale to meet the needs of its users. A specific instantiation of a service provided by cloud infrastructure system is referred to herein as a service instance. In general, any service made available to a user via a communication network such as the Internet from a cloud service provider's system is referred to as a cloud service. Typically, in a public cloud environment, servers and systems that make up the cloud service provider's system are different from the customer's own on-premises servers and systems. For example, a cloud service provider's system may host an application and a user may, via a communication network such as the Internet, on demand, order and use the application.

FIG. 1 is a block diagram that conceptually illustrates an example of a shared IDM system 100 from a tenant's perspective, according to an embodiment of the invention. In some embodiments, the shared IDM system 100 is implemented in a cloud computing environment and that may be partitioned into multiple separate identity domains. Shared IDM system 100 can include a shared IDM infrastructure 105, application or service instances in identity domains 110A-N, and tenant users 115A-N. Notably, tenant A users 115A can use application or service instances in identity domain 110A, tenant B users 115B can use application or service instances in identity domain B 110B, and tenant C users 115C can use service instances in identity domain C 110C. Each identity domain can be isolated from each other identity domain in shared IDM system 100, such that each tenant's users can be permitted to use only the service instances in that tenant's identity domain. A particular customer or enterprise of the provider of shared IDM system 100 can create one or more tenancies, or identity domains, within the cloud computing environment.

In the illustrated model of the IDM infrastructure 105, the following services may be performed by the IDM system 100: administration and provisioning 120, policy decision services 125, and identity policy assertion services 130. The administration and provisioning 120 provides administration and provisioning services for the identities managed by the identity management infrastructure. These service may include editing groups (including creating, updating, and deleting groups), defining group membership using one or more rules, and publishing messages within the cloud computing environment to deliver and process events concerning the groups (e.g., identify and add new members to a group based on the one or more rules). Policy decision services 125 performs policy decision services for the IDM infrastructure 105 (e.g., identity whether a requested resource requires authentication of the user or identify a level of authorization required to access a resource). The identity policy assertion services 130 provides services such as single sign-on and certificate authority to access various application or service instances in identity domains 110A-N deployed against the IDM infrastructure 105 (e.g., validate a credential based on policy decisions and create a single sign-on session for a user to access an application or resource of an application upon credential validation). The administration and provisioning 120, the policy decision services 125, and the identity policy assertion services 130 may access database 135 comprising policies, group information, and user or identity information to perform their associated services. In some instances, the group information includes groups and associated rules that define membership requirements for each group. In some instances, the user or identity information includes all registered users for the shared IDM system 100, unique identifiers associated with each user, group membership information for each user, and one or more roles for each user.

Application or service instances in identity domains 110A-N may interact with the IDM infrastructure 105 in the following ways: user authentication 140 and user authorization 145. The user authentication 140 validates user credentials using services provided by the IDM infrastructure 105 when a user requests access to an application. The authentication and the associated communication to the application may be accomplished with the identity policy assertion services 130. For example, in the case of the IDM infrastructure 105, this may be validation of a credential, in the form of an encrypted browser cookie, by a single sign-on session. The user authorization 145, once a user is authenticated, the identity domains 110A-N may also check if the user has sufficient privileges over resources protected by an application. This check may be performed by the application based on the user and identity information managed in the IDM infrastructure 105. For example, an application may use the IDM infrastructure 105 and policy decision services 125 to access group information, and user or identity information from database 135, after authentication to determine whether a user is assigned group membership or a role with authorization to access the application or resource.

It will be appreciated that techniques disclosed herein can be applied to administrate and perform other services outside the context of data protection (authentication and authorization services), which is simply provided as an exemplary service capable of being provided by the shared IDM system 100. For example, techniques disclosed herein can be applied to provisioning, managing and tracking a customer's subscription for services and resources in the cloud computing environment, providing predictable operating expenses to customers utilizing the services in the cloud infrastructure system, and the like. It will also be appreciated that other types of data within the shared IDM system 100 are contemplated to be used by the techniques disclosed herein for executing the other services. For example, alternatively or additionally, other group information or user information such permissions or subscriptions could be used for executing the other services.

In various embodiments, the administration and provisioning 120 provides administration and provisioning services for editing groups (including creating, updating, and deleting groups), defining group membership using one or more rules, and publishing messages within the cloud computing environment to deliver and process events concerning the groups (e.g., identify and add new members to a group based on the one or more rules). The administration and provisioning 120 may use a publication/subscription service 150 within the cloud computing environment to perform these administration and provisioning services. The publication/subscription service 150 is a fully-managed real-time messaging service that allows a customer or enterprise to send and receive messages between independent processing nodes or applications. Advantageously, publication/subscription service 150 is a scalable service that should be able to handle increases in load without noticeable degradation of latency or availability. As used herein, a "load" can refer to various dimensions of usage in publication/subscription service 150 including number of topics, number of publishers, number of subscribers, number of subscriptions, number of messages, size of messages, rate of messages, and size of backlog of a subscription.

The publication/subscription service 150 comprises messages 155, message topics and/or queues 160, subscriptions 165, and publishers and/or subscribers 170. The messages 155 comprise the data that moves through the publication/subscription service 150. In some instances, the data of the messages 155 includes requests, replies, error messages, or just plain information. In some instances, the messages 155 include a request or instruction for retrieval of data or one or more processes to be performed. In some instances, the data of the messages 155 further includes a classifier that categorizes the messages 155 into a subscribable class. The message topics and/or queues 160 are named entities that each represent a feed of messages 155. A publisher 170 (e.g., administration and provisioning 120) creates and sends messages 155 to a message topic and/or queue 160. A subscriber 170 generates subscriptions 165 to obtain the messages 155 from the message topic and/or queue 160. A publisher 170 creates messages 155 and sends (publishes) them to the messaging service on a specified message topic and/or queue 160. A subscriber 170 (also called a consumer) obtains or receives messages 155 on a specified subscription 165. The subscription 165 is a named entity that represents an interest of the subscriber 170 in receiving messages on a particular message topic and/or from a particular message queue 160. In some instances, a computing node or application can be both a publisher and a subscriber 170.

In various embodiments, the computing node or application that act as the publisher and a subscriber 170 are virtual machines. As used herein, a "virtual machine" is a computer file, typically called an image, that behaves like an actual computing node or application. In other words, creating a computing node or application within a computing system such as the cloud computing environment of the IDM system 100. The virtual machine runs much like any other program, giving the end user the same experience on a virtual machine as they would have on the host operating system itself. The virtual machine is sandboxed from the rest of the IDM system 100, meaning that the software inside a virtual machine can't escape or tamper with the computer itself. Moreover, virtual machines can be easily add or removed from the IDM system 100 by the node control 175 as needed to optimize utilization of computing nodes or applications within the IDM system 100 (e.g., load balancing and scalability).

In some instances, a publisher 170 adds a message 155 to the message topic 160, and any message 155 published to the topic 160 is available to be obtained and processed by all of the subscribers 170 to the topic 160. To add a message 155, the publisher 170 pushes the message 155 to the topic. Unlike message queues, which batch messages until they are retrieved, message topics transfer messages with no or very little queuing, and push them out immediately or substantially immediately to all subscribers. In any disclosed embodiment, the term "substantially," "approximately," or "about" may be substituted with "within [a percentage] of" what is specified, where the percentage includes 0.1, 1, 5, and 10 percent. All subscribers that subscribe to the topic will receive every message that is broadcast, unless a message filtering policy is set by the subscriber. In other embodiments, a producer 170 adds a message 155 to the message queue 160, and the message is stored on the message queue 160 until another a subscriber 170 retrieves the message 155 and does something with it. Many producers and consumers can use the message queue, but each message is processed only once, by a single subscriber. For this reason, this messaging pattern is often called one-to-one, or point-to-point, communications. When a message needs to be processed by more than one subscriber, message queues can be combined with topic based messaging in a fanout design pattern.

The life cycle of a message within the publication/subscription service 150 may include publication of a message 155 with a first event type on the message topic and/or queue 160. The message topic and/or queue 160 sends an acknowledgement to the publisher 170 that it has received the message 155 and writes the message to storage. At the same time as writing or subsequent to writing the message 155 to storage, the message topic and/or queue 160 provides delivery or availability of the message 155 to subscribers 170 via the attached subscriptions 165 (message topic and/or queue 160 has a list of all subscriptions that are attached to a message topic and/or queue). Subscribers 170 receive messages by connecting to message topic and/or queue 160. "Connecting" in the case of a pull subscriber means issuing a pull request. "Connecting" in the case of a push subscriber means having the push endpoint registered with message topic and/or queue 160. Once a subscriber 170 obtains and processes a message, it sends an acknowledgement back to the message topic and/or queue 160. Once all subscriptions 165 of a message topic and/or queue 160 have acknowledged a message, the message is asynchronously deleted from the message topic and/or queue 160 and no longer available to subscribers 170.

Group Membership Techniques Using a Publication/Subscription Service

Figure 2:
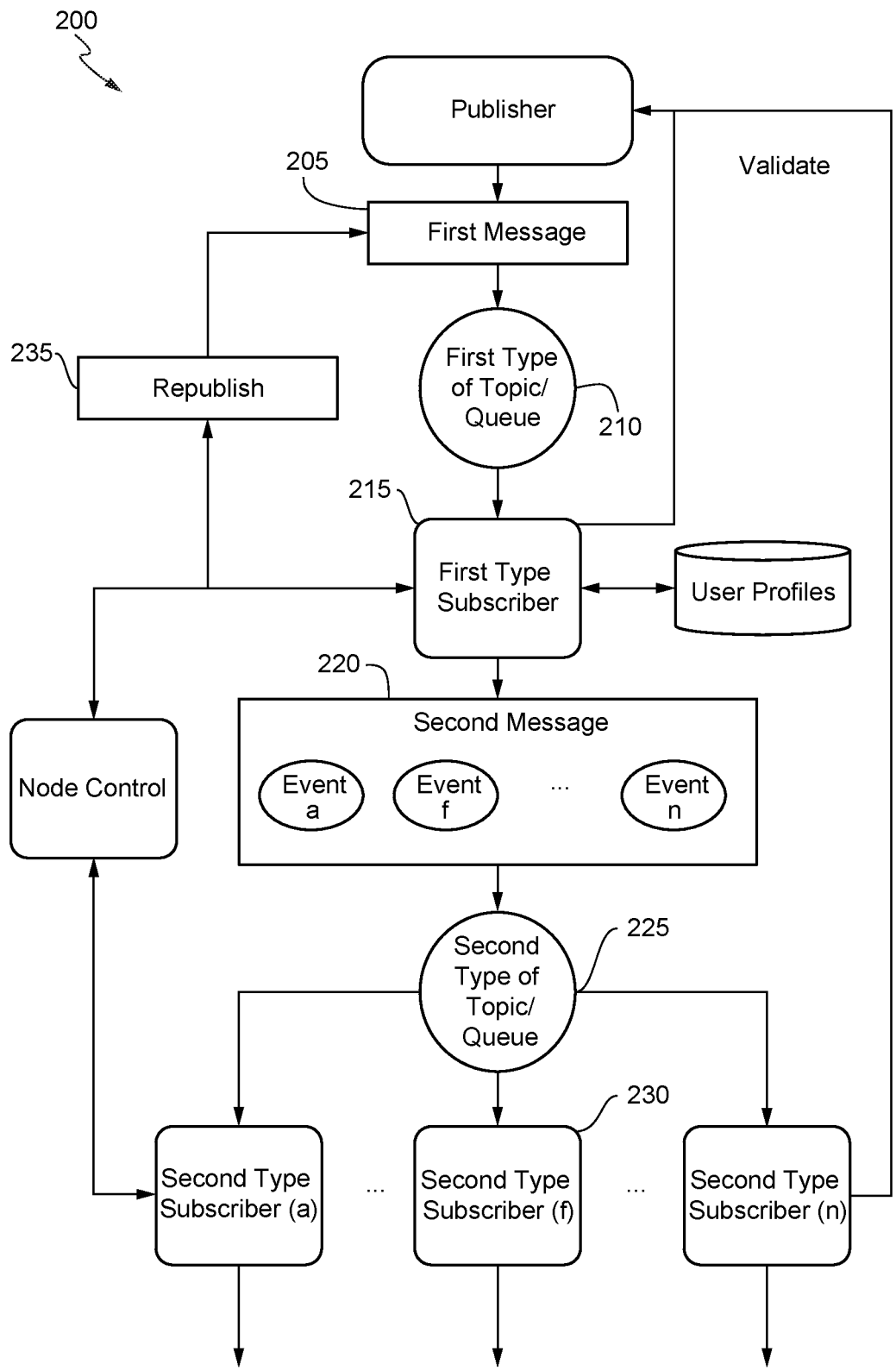
FIG. 2 shows a block diagram for dynamically assigning membership to users in the system based on dynamic rules in accordance with various embodiments.

FIG. 2 shows a block diagram 200 for creating a new group and adding users to the group using publication/subscription service (e.g., the publication/subscription service 150 described with respect to FIG. 1). At block 205, a publisher creates and sends a first message to a data processing system. In some instances, the publisher is a IDM system or a component of the IDM system, e.g., an administration and provisioning service. In some instances, the data processing system is a publication/subscription service or comprises a component of the publication/subscription service, e.g., a first message topic and/or queue. The first message is for a first type of event. In certain instances, the first type of event comprises a request to identify and fetch users for a group based on a rule.

At block 210, the first message topic and/or queue sends an acknowledgement to the publisher that it has received the first message and writes the first message to storage. At the same time as writing or subsequent to writing the first message to storage, the first message topic and/or queue provides delivery or availability of the first message to a first type of subscriber via attached subscriptions (the first message topic and/or queue has a list of all subscriptions that are attached to the first message topic and/or queue). In certain instances, the first message topic and/or queue has a list of multiple subscriptions to the message topic and/or queue from multiple subscribers of the first type of subscriber. However, the first message topic and/or queue only makes the first message available to a single subscriber of the first type of subscriber (a first subscriber) and deletes the message from the topic upon the first subscriber obtaining the message or places the first message in a queue and upon the message being retrieved from the queue by a single subscriber of the first type of subscriber (a first subscriber), the first message is deleted from the queue.

At block 215, the first subscriber validates the first message. In certain instances, the validating comprises determining whether the rule has been removed or modified for the group. In other words, the first subscriber determines whether the rule to be used for identifying users for association with the groups has been removed or modified in the time between the first message being created and published by the publisher and the first subscriber obtaining the first message. When the rule has been removed or modified for the group, the processing of the first message stops with the first subscriber at block 215. A new event may be published separately by the publisher for the rule using an update/removal message and rule (FIG. 3), which advantageously saves on overall computation cycles.

Continuing at block 215, when the rule has not been removed or modified for the group, the first subscriber fetches a plurality of user identifiers associated with a plurality of the users that satisfy the rule. In some instances, the first subscriber fetches the plurality of user identifiers by running a search on the user profiles or information associated with users of the system based on one or more attributes of the rule. As used herein, when an action is "based on" something, this means the action is based at least in part on at least a part of the something. For example, if the rule is only users with a secret level security clearance are to be assigned to the group then the first subscriber may fetch the plurality of user identifiers by running a search for a secret level security clearance on the user profiles or information associated with users of the system.

Upon fetching the plurality of user identifiers for the plurality of users that satisfy the rule, the first subscriber identifies a first group of user identifiers of the plurality of user identifiers based on a first configurable property. The first group of user identifiers are identified by the first subscriber for further processing by the publication/subscription service. The first configurable property may be a threshold of user identifiers or users to be processed for a group add operation. For example, if fetching the plurality of user identifiers for the plurality of users results in one million user identifiers being retrieved and the first configurable property is set at one thousand user identifiers or users to be processed for a group add operation at a time, then the first subscriber identifies a first group of one thousand user identifiers of the plurality of user identifiers to be further processed by the publication/subscription service. The one thousand user identifiers or users may be identified by simply identifying the first one thousand user identifiers or users in a list of the plurality of user identifiers for the plurality of users that satisfy the rule. Alternatively, one thousand user identifiers or users may be identified by sorting the list of the plurality of user identifiers for the plurality of users that satisfy the rule based on a parameters (e.g., alphabetical by last name, or identifier (ID)) and then identifying the first one thousand user identifiers or users in the sorted list of the plurality of user identifiers for the plurality of users that satisfy the rule.

In some embodiments, the first group of user identifiers is further split by the first subscriber into subgroups of user identifiers based on a second configurable property. The second configurable property may be a threshold of user identifiers or users to be processed for a group add event to be processed by each thread or subscriber. A thread being a portion of the overall process, for example, a portion of the group add operation based on the rule. In some instances, a subscriber can obtain and process a single event at a time on a single thread, and in certain instances process multiple events in parallel or sequentially using respective multiple threads (e.g., four threads). The first configurable property and the second configurable property may be configured in order to maintain availability of computing nodes or applications, minimize latency (a time-based measure of the performance of a system), and/or take advantage of scalability of the architecture. For example, if the first configurable property is set at one thousand user identifiers or users to be processed for a group add operation at a time and the second configurable property is set at one hundred user identifiers or users to be processed to be processed on a thread for a group add operation at a time, then the first subscriber splits the one thousand user identifiers in the first group into ten subgroups of user identifiers (each subgroup having one hundred user identifiers) based on the second configurable property. In some instances, the subgroups of user identifiers comprise a first subgroup of user identifiers and a second subgroup of user identifiers.

At block 220, the first subscriber publishes a second message for each subgroup of the first group of user identifiers to the data processing system. In some instances, the data processing system is a publication/subscription service or comprises a component of the publication/subscription service, e.g., a second message topic and/or queue. The second message is for a second type of event. In certain instances, the second type of event comprises a request to add the subgroup of user identifiers to the group based on the rule. Continuing with the above example, the first subscriber may publish ten second messages for the second type event (one message for each subgroup of the ten subgroups of user identifiers), and each second message would include the one hundred identifiers associates with the subgroup and a request to add the one hundred identifiers to the group.

At block 225, the second message topic and/or queue sends an acknowledgement to the first subscriber that it has received the second messages and writes the second messages to storage. At the same time as writing or subsequent to writing the second message to storage, the second message topic and/or queue provides delivery or availability of each second message to a second type of subscriber via attached subscriptions (the second message topic and/or queue has a list of all subscriptions that are attached to the second message topic and/or queue). In certain instances, the second message topic and/or queue has a list of multiple subscriptions to the message topic and/or queue from multiple subscribers of the second type of subscriber. However, the second message topic and/or queue only makes each second message of the second messages available to a single subscriber of the second type of subscriber (e.g., a second subscriber or a third subscriber) and deletes each second message from the topic upon the second type of subscriber obtaining the second message or places the each second message of the second messages in a queue and upon each second message being retrieved from the queue by a single subscriber of the second type of subscriber (e.g., a second subscriber or a third subscriber), each second message is deleted from the queue. Continuing with the above example, a second type of subscriber may obtain one or more of the second messages and process the subgroup of user identifiers contained within the one or more second messages. More specifically, the second type of subscriber may be configured to process multiple threads in parallel or serially (e.g., four threads), and thus each second type of subscriber may obtain and process multiple second messages dependent upon their thread configuration. For example, a second subscriber may obtain four of the second messages process in parallel or serially the four subgroup of user identifiers contained within the four second messages respectively on four threads, and a third subscriber may obtain four of the second messages process in parallel or serially the four subgroup of user identifiers contained within the four second messages respectively on four threads.

In some instances, if the list of multiple subscriptions to the second message topic and/or queue does not include a sufficient number of second type of subscribers to process the second messages received from the first subscriber, then the second message topic and/or queue may notify node control that additional virtual machines (e.g., second type of subscribers) are needed for processing the second messages. The node control may provision additional virtual machines (e.g., second type of subscribers) that will register subscriptions with the second message topic and/or queue for processing the second messages. Alternatively, if the list of multiple subscriptions to the second message topic and/or queue include an excess number of second type of subscribers to process the second messages received from the first subscriber, then the second message topic and/or queue may notify node control that excess virtual machines (e.g., second type of subscribers) are present and may be removed from the system to free of resources and processing power. The node control may remove the excess virtual machines (e.g., second type of subscribers) and unregister subscriptions for the excess virtual machines with the second message topic and/or queue. Accordingly, publication/subscription services provided by the cloud infrastructure system can dynamically scale to meet the needs of its users.

At block 230, each second type of subscriber validates the second message. In certain instances, the validating comprises determining whether the rule has been removed or modified for the group. In other words, each second type of subscriber determines whether the rule to be used for adding the subgroup of user identifiers to the group has been removed or modified in the time between the first message being created and published by the publisher and the second type of subscriber obtaining the second message. When the rule has been removed or modified for the group, the processing of the second message stops with the second type of subscriber at block 230. A new event may be published separately by the publisher for the rule using an update/removal message and rule (FIG. 3), which advantageously saves on overall computation cycles.

Continuing at block 230, when the rule has not been removed or modified for the group, each second type of subscriber adds the subgroup of user identifiers within the one or more second messages obtained by the second type of subscriber to the group to assign group membership to each subgroup of the users associated with each subgroup of user identifiers. In some instances, a second subscriber adds the first subgroup of user identifiers to the group to assign group membership to a first subgroup of the users associated with the first subgroup of user identifiers, and a third subscriber adds the second subgroup of user identifiers to the group to assign group membership to a second subgroup of the users associated with the second subgroup of user identifiers. Once each second type of subscriber processes a second message, it sends an acknowledgement back to the second message topic and/or queue (second message topic and/or queue may relay this acknowledgement to the publisher) or the publisher to notify the publisher that a subgroup of user identifiers has been added to the group.

At block 235, the first subscriber may retain a user identifier for the last user in the first group of user identifiers. The user identifier for the last user in the first group of user identifiers may be used to maintain state for processing of additional groups of user identifiers for the plurality of users identified and fetched in block 215. The first subscriber may then republish the first message for the first type of event on the the first message topic and/or queue. The first message may be published with the user identifier for the last user in the first group of user identifiers to maintain state for processing of the groups of user identifiers. Thereafter, a single subscriber of the first type of subscriber (a fourth subscriber) obtains the republished first message starts processing the first message in accordance with the user identifier for the last user in the first group of user identifiers and the processes described with respect to blocks 215-230. The first type of subscriber (a fourth subscriber) that obtains the republished first message may be a same or different subscriber as the first type of subscriber (a first subscriber) that obtained and processed the published first message. In certain instances, block 235 is performed by the first subscriber after publishing the second messages or after processing of the second messages is complete (which would require acknowledgment of completion of the second messages back to the first subscriber).

Continuing with the above example, a first type of subscriber (fourth subscriber) may obtain the republished first message and validates the first message. When the rule has not been removed or modified for the group, the first type of subscriber (fourth subscriber) fetches the plurality of user identifiers associated with the plurality of the users that satisfy the rule. Thereafter, the first type of subscriber (fourth subscriber) identifies a second group of user identifiers (e.g., the next group of one thousand user identifiers) of the plurality of user identifiers based on the first configurable property and the user identifier for the last user in the first group of user identifiers, splits the second group of user identifiers into subgroups of user identifiers based on the second configurable property, and publishes the second message for the second type of event for each subgroup of the second group of user identifiers.

Figure 3:
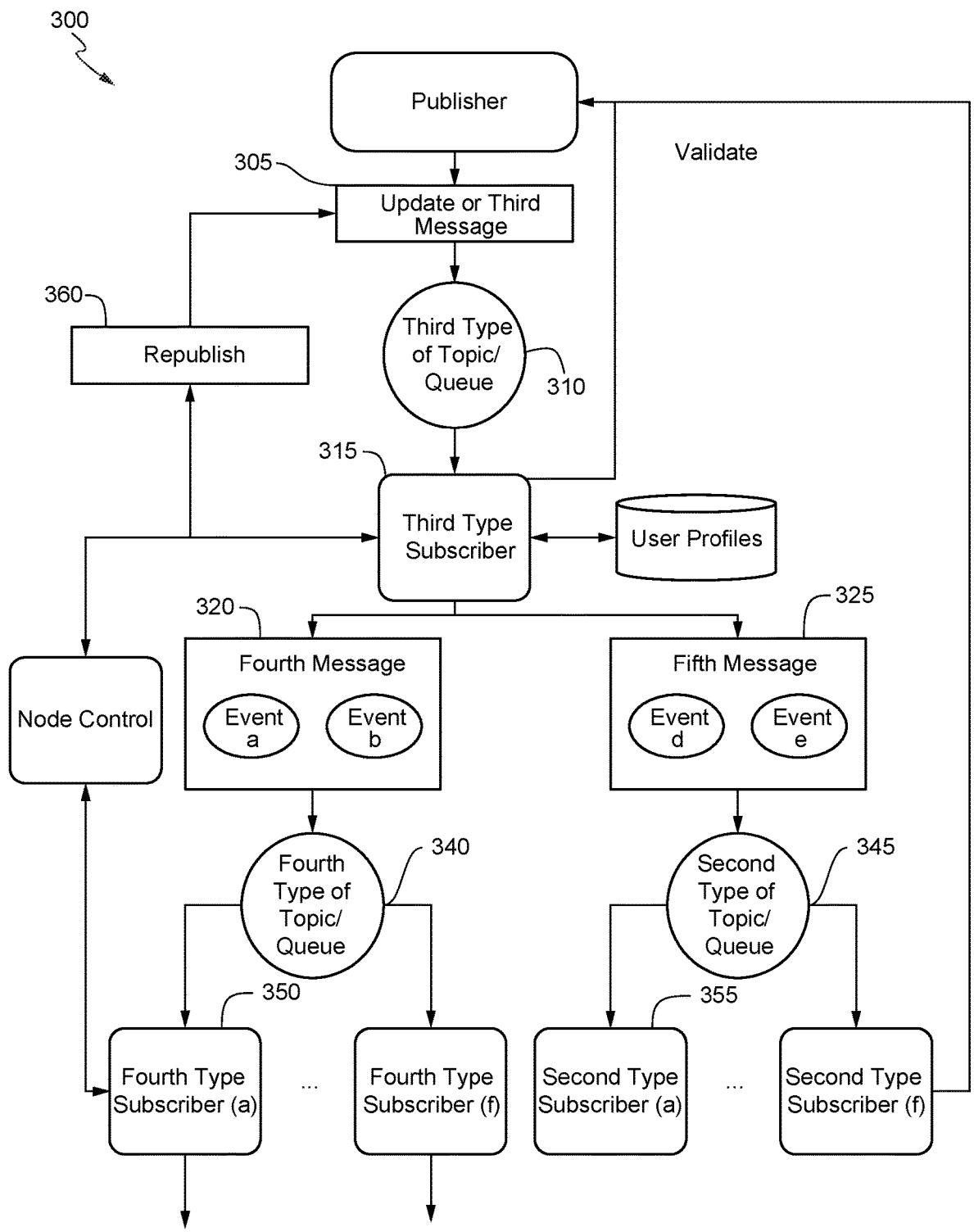
FIG. 3 shows a block diagram for dynamically assigning and unassigning membership to users in the system based on dynamic rules in accordance with various embodiments.

FIG. 3 shows a block diagram 300 for updating a group (e.g., the group created in FIG. 2) by removing users from the group that so not satisfy a new rule for the group and adding users to the group that do satisfy the new rule using publication/subscription service (e.g., the publication/subscription service 150 described with respect to FIG. 1). In some instances, these processes may be triggered by the validation process in block diagram 200 determining that a rule is no longer valid. The following description assumes that the processes of block diagram 300 have been triggered by the validation process in block diagram 200 after processing the first group of user identifiers. However, this is merely assumed for purposes of describing the following processes and is not limiting, for example, block diagram 300 could be started by the publisher creating a new message requesting a group add operation without a validation trigger. At block 305, a publisher creates and sends a update or third message to a data processing system. In some instances, the publisher is a IDM system or a component of the IDM system, e.g., an administration and provisioning service. In some instances, the data processing system is a publication/subscription service or comprises a component of the publication/subscription service, e.g., a third message topic and/or queue. The third message is for a third type of event. In certain instances, the third type of event comprises a request to identify and fetch users for a group based on a new rule, where the identification and fetching is two parts: (i) fetching one or more user identifiers associated with one or more users that have been assigned group membership to the group that do not satisfy the new rule, and (ii) fetching one or more user identifiers associated with one or more users that satisfy the new rule.

At block 310, the third message topic and/or queue sends an acknowledgement to the publisher that it has received the third message and writes the third message to storage. At the same time as writing or subsequent to writing the third message to storage, the third message topic and/or queue provides delivery or availability of the third message to a third type of subscriber via attached subscriptions (the third message topic and/or queue has a list of all subscriptions that are attached to the third message topic and/or queue). In certain instances, the third message topic and/or queue has a list of multiple subscriptions to the message topic and/or queue from multiple subscribers of the first type of subscriber. However, the third message topic and/or queue only makes the third message available to a single subscriber of the third type of subscriber (a fifth subscriber) and deletes the message from the topic upon the fifth subscriber obtaining the message or places the third message in a queue and upon the message being retrieved from the queue by a single subscriber of the third type of subscriber (a fifth subscriber), the third message is deleted from the queue.

At block 315, the fifth subscriber validates the third message. In certain instances, the validating comprises determining whether the new rule has been removed or modified for the group. In other words, the fifth subscriber determines whether the new rule to be used for identifying users for association with the groups has been removed or modified in the time between the third message being created and published by the publisher and the fifth subscriber obtaining the third message. When the new rule has been removed or modified for the group, the fifth subscriber informs the third message topic and/or queue that the third message is not valid and cannot be processed, and the processing of the third message stops at block 315. The third message topic and/or queue informs the publisher that the third message is not valid and cannot be processed such that the publisher can initiate a new group process with a new message and rule (FIG. 2) or a update group process with a new message and rule (FIG. 3).

Continuing at block 315, when the rule has not been removed or modified for the group, the fifth subscriber fetches one or more user identifiers associated with one or more users that have been assigned group membership to the group that do not satisfy the new rule. For example, if the new rule has changed and only users with a top secret level security clearance are to be assigned to the group, then the fifth subscriber may fetch one or more user identifiers associated with one or more users that have been assigned group membership to the group that do not have a top secret level security clearance on the user profiles or information associated with the one or more users.

Upon fetching the one or more user identifiers associated with one or more users that have been assigned group membership to the group that do not satisfy the new rule, the fifth subscriber identifies a second group of user identifiers of the one or more user identifiers based on the first configurable property. The second group of user identifiers are identified by the fifth subscriber for further processing by the publication/subscription service. The first configurable property may be a threshold of user identifiers or users to be processed for a group add operation. In some embodiments, the second group of user identifiers is further split by the fifth subscriber into subgroups of user identifiers based on the second configurable property. The second configurable property may be a threshold of user identifiers or users to be processed for a group add event to be processed by each thread or subscriber. The first configurable property and the second configurable property may be configured in order to maintain availability of computing nodes or applications, minimize latency (a time-based measure of the performance of a system), and/or take advantage of scalability of the architecture. For example, if the first configurable property is set at one thousand user identifiers or users to be processed for a group add operation at a time and the second configurable property is set at one hundred user identifiers or users to be processed on a thread for a group add operation at a time, then the fifth subscriber splits the one thousand user identifiers in the second group into ten subgroups of user identifiers (each subgroup having one hundred user identifiers) based on the second configurable property. In some instances, the subgroups of user identifiers comprise a third subgroup of user identifiers and a fourth subgroup of user identifiers.

Additionally at block 315, when the rule has not been removed or modified for the group, the fifth subscriber fetches a plurality of user identifiers associated with a plurality of the users that satisfy the new rule which are not already part of the group (this ensures that computation cycles are not wasted in reassigning membership to users which are already part of the group). In some instances, the fifth subscriber fetches the plurality of user identifiers by running a search on the user profiles or information associated with users of the system based on one or more attributes of the new rule. For example, if the rule is only users with a top secret level security clearance are to be assigned to the group then the fifth subscriber may fetch the plurality of user identifiers by running a search for a top secret level security clearance on the user profiles or information associated with users of the system.

Upon fetching the plurality of user identifiers for the plurality of users that satisfy the new rule and are not already part of the group, the fifth subscriber identifies a third group of user identifiers of the plurality of user identifiers based on the first configurable property. The first group of user identifiers are identified by the fifth subscriber for further processing by the publication/subscription service. The first configurable property may be a threshold of user identifiers or users to be processed for a group add operation. In some embodiments, the third group of user identifiers is further split by the fifth subscriber into subgroups of user identifiers based on the second configurable property. The second configurable property may be a threshold of user identifiers or users to be processed for a group add event to be processed by each thread or subscriber. The first configurable property and the second configurable property may be configured in order to maintain availability of computing nodes or applications, minimize latency (a time-based measure of the performance of a system), and/or take advantage of scalability of the architecture. For example, if the first configurable property is set at one thousand user identifiers or users to be processed for a group add operation at a time and the second configurable property is set at one hundred user identifiers or users to be processed to be processed on a thread for a group add operation at a time, then the fifth subscriber splits the one thousand user identifiers in the third group into ten subgroups of user identifiers (each subgroup having one hundred user identifiers) based on the second configurable property. In some instances, the subgroups of user identifiers comprise a first subgroup of user identifiers and a second subgroup of user identifiers.

At block 320, the fifth subscriber publishes a fourth message for each subgroup of the second group of user identifiers to the data processing system. In some instances, the data processing system is a publication/subscription service or comprises a component of the publication/subscription service, e.g., a fourth message topic and/or queue. The fourth message is for a fourth type of event. In certain instances, the fourth type of event comprises a request to remove each subgroup of user identifiers from the group based on the new rule. Continuing with the above example, the fifth subscriber may publish ten fourth messages for the fourth type event (one message for each subgroup of the ten subgroups of user identifiers), and each fourth message would include the one hundred identifiers associates with the subgroup and a request to remove the one hundred identifiers from the group.

At block 325, the fifth subscriber publishes a fifth message for each subgroup of the third group of user identifiers to the data processing system. In some instances, the data processing system is a publication/subscription service or comprises a component of the publication/subscription service, e.g., the second message topic and/or queue. The fifth message is for the second type of event. In certain instances, the second type of event (as discussed with respect to block diagram 200 in FIG. 2) comprises a request to add each subgroup of user identifiers to the group based on the new rule. Continuing with the above example, the fifth subscriber may publish ten fifth messages for the second type event (one message for each subgroup of the ten subgroups of user identifiers), and each fifth message would include the one hundred identifiers associates with the subgroup and a request to add the one hundred identifiers to the group.

At block 340, the fourth message topic and/or queue sends an acknowledgement to the fifth subscriber that it has received the fourth messages and writes the fourth messages to storage. At the same time as writing or subsequent to writing the fourth messages to storage, the fourth message topic and/or queue provides delivery or availability of each fourth message to a fourth type of subscriber via attached subscriptions (the fourth message topic and/or queue has a list of all subscriptions that are attached to the fourth message topic and/or queue). In certain instances, the fourth message topic and/or queue has a list of multiple subscriptions to the message topic and/or queue from multiple subscribers of the third type of subscriber. However, the fourth message topic and/or queue only makes each fourth message of the fourth messages available to a single subscriber of the third type of subscriber (e.g., a sixth subscriber or a seventh subscriber) and deletes each fourth message from the topic upon the third type of subscriber obtaining the fourth message or places the each fourth message of the fourth messages in a queue and upon each fourth message being retrieved from the queue by a single subscriber of the third type of subscriber (e.g., a sixth subscriber or a seventh subscriber), each fourth message is deleted from the queue. Continuing with the above example, a fourth type of subscriber may obtain one or more of the fourth messages and process the subgroup of user identifiers contained within the one or more fourth messages. More specifically, the fourth type of subscriber may be configured to process multiple threads in parallel or serially (e.g., four threads), and thus each fourth type of subscriber may obtain and process multiple fourth messages dependent upon their thread configuration. For example, a sixth subscriber may obtain four of the fourth messages process in parallel or serially the four subgroup of user identifiers contained within the four second messages respectively on four threads, and a seventh subscriber may obtain four of the second messages process in parallel or serially the four subgroup of user identifiers contained within the four second messages respectively on four threads.

At block 345, the second message topic and/or queue sends an acknowledgement to the fifth subscriber that it has received the fifth messages and writes the fifth messages to storage. At the same time as writing or subsequent to writing the fifth messages to storage, the second message topic and/or queue provides delivery or availability of each fifth message to a second type of subscriber via attached subscriptions (the second message topic and/or queue has a list of all subscriptions that are attached to the second message topic and/or queue). In certain instances, the second message topic and/or queue has a list of multiple subscriptions to the message topic and/or queue from multiple subscribers of the second type of subscriber. However, the second message topic and/or queue only makes each fifth message of the fifth messages available to a single subscriber of the second type of subscriber (e.g., an eighth subscriber or a ninth subscriber) and deletes each fifth message from the topic upon the second type of subscriber obtaining the fifth message or places the each fifth message of the fifth messages in a queue and upon each fifth message being retrieved from the queue by a single subscriber of the second type of subscriber (e.g., an eighth subscriber or a ninth subscriber), each fifth message is deleted from the queue. Continuing with the above example, a second type of subscriber may obtain one or more of the fifth messages and process the subgroup of user identifiers contained within the one or more fifth messages. More specifically, the second type of subscriber may be configured to process multiple threads in parallel or serially (e.g., four threads), and thus each second type of subscriber may obtain and process multiple fifth messages dependent upon their thread configuration. For example, an eighth subscriber may obtain four of the fifth messages process in parallel or serially the four subgroup of user identifiers contained within the four fifth messages respectively on four threads, and a ninth subscriber may obtain four of the fifth messages process in parallel or serially the four subgroup of user identifiers contained within the four fifth messages respectively on four threads.

In some instances, if the list of multiple subscriptions to the fourth or second message topic and/or queue does not include a sufficient number of fourth or second type of subscribers to process the fourth or fifth messages received from the fifth subscriber, then the fourth or second message topic and/or queue may notify node control that additional virtual machines (e.g., fourth or second type of subscribers) are needed for processing the fourth or fifth messages. The node control may provision additional virtual machines (e.g., fourth or second type of subscribers) that will register subscriptions with the fourth or second message topic and/or queue for processing the second messages. Alternatively, if the list of multiple subscriptions to the fourth or second message topic and/or queue include an excess number of fourth or second type of subscribers to process the fourth or fifth messages received from the fifth subscriber, then the fourth or second message topic and/or queue may notify node control that excess virtual machines (e.g., fourth or second type of subscribers) are present and may be removed from the system to free of resources and processing power. The node control may remove the excess virtual machines (e.g., fourth or second type of subscribers) and unregister subscriptions for the excess virtual machines with the fourth or second message topic and/or queue. Accordingly, publication/subscription services provided by the cloud infrastructure system can dynamically scale to meet the needs of its users.

At block 350, each fourth type of subscriber validates the fourth message. In certain instances, the validating comprises determining whether the rule has been removed or modified for the group. In other words, each fourth type of subscriber determines whether the rule to be used for removing the subgroup of user identifiers from the group has been removed or modified in the time between the third message being created and published by the publisher and the fourth type of subscriber obtaining the fourth message. When the rule has been removed or modified for the group, the fourth type of subscriber informs the fourth message topic and/or queue that the fourth message is not valid and cannot be processed, and the processing of the fourth message stops at block 350. The fourth message topic and/or queue informs the publisher that the fourth message is not valid and cannot be processed such that the publisher can initiate a new group process with a new message and rule (FIG. 2) or a update group process with a new message and rule (FIG. 3).

Continuing at block 350, when the rule has not been removed or modified for the group, each fourth type of subscriber removes the subgroup of user identifiers within the one or more fourth messages obtained by the fourth type of subscriber from the group to unassign group membership for each subgroup of the users associated with each subgroup of user identifiers. In some instances, a sixth subscriber removes the first subgroup of user identifiers from the group to unassign group membership for a first subgroup of the users associated with the first subgroup of user identifiers, and a seventh subscriber removes the second subgroup of user identifiers from the group to unassign group membership for a second subgroup of the users associated with the second subgroup of user identifiers. Once each fourth type of subscriber processes a fourth message, it sends an acknowledgement back to the fourth message topic and/or queue (fourth message topic and/or queue may relay this acknowledgement to the publisher) or the publisher to notify the publisher that a subgroup of user identifiers has been removed from the group.

At block 355, each second type of subscriber validates the fifth message. In certain instances, the validating comprises determining whether the rule has been removed or modified for the group. In other words, each second type of subscriber determines whether the rule to be used for adding the subgroup of user identifiers to the group has been removed or modified in the time between the third message being created and published by the publisher and the second type of subscriber obtaining the fifth message. When the rule has been removed or modified for the group, the second type of subscriber informs the second message topic and/or queue that the second message is not valid and cannot be processed, and the processing of the second message stops at block 355. The second message topic and/or queue informs the publisher that the fifth message is not valid and cannot be processed such that the publisher can initiate a new group process with a new message and rule (FIG. 2) or a update group process with a new message and rule (FIG. 3).

Continuing at block 355, when the rule has not been removed or modified for the group, each second type of subscriber adds the subgroup of user identifiers within the one or more fifth messages obtained by the second type of subscriber to the group to assign group membership to each subgroup of the users associated with each subgroup of user identifiers. In some instances, a eighth subscriber adds the first subgroup of user identifiers to the group to assign group membership to a first subgroup of the users associated with the first subgroup of user identifiers, and a ninth subscriber adds the second subgroup of user identifiers to the group to assign group membership to a second subgroup of the users associated with the second subgroup of user identifiers. Once each second type of subscriber processes a fifth message, it sends an acknowledgement back to the second message topic and/or queue (second message topic and/or queue may relay this acknowledgement to the publisher) or the publisher to notify the publisher that a subgroup of user identifiers has been added to the group.

At block 360, the third subscriber may retain a user identifier for the last user in the second and/or third group of user identifiers. The user identifier for the last user in the second and/or third group of user identifiers may be used to maintain state for processing of additional groups of user identifiers for the users identified and fetched in blocks 315. The fifth subscriber may then republish the third message for the third type of event on the the third message topic and/or queue. The third message may be published with the user identifier for the last user in the second and/or third group of user identifiers to maintain state for processing of the groups of user identifiers. Thereafter, a single subscriber of the third type of subscriber (a tenth subscriber) obtains the republished third message starts processing the third message in accordance with the user identifier for the last user in the second and/or third group of user identifiers and the processes described with respect to blocks 315-355. The third type of subscriber (a tenth subscriber) that obtains the republished third message may be a same or different subscriber as the third type of subscriber (a fifth subscriber) that obtained and processed the published third message. In certain instances, block 360 is performed by the fifth subscriber after publishing the fourth and/or fifth messages or after processing of the fourth and/or fifth messages is complete (which would require acknowledgment of completion of the fourth and/or fifth messages back to the fifth subscriber).

Figure 4A:
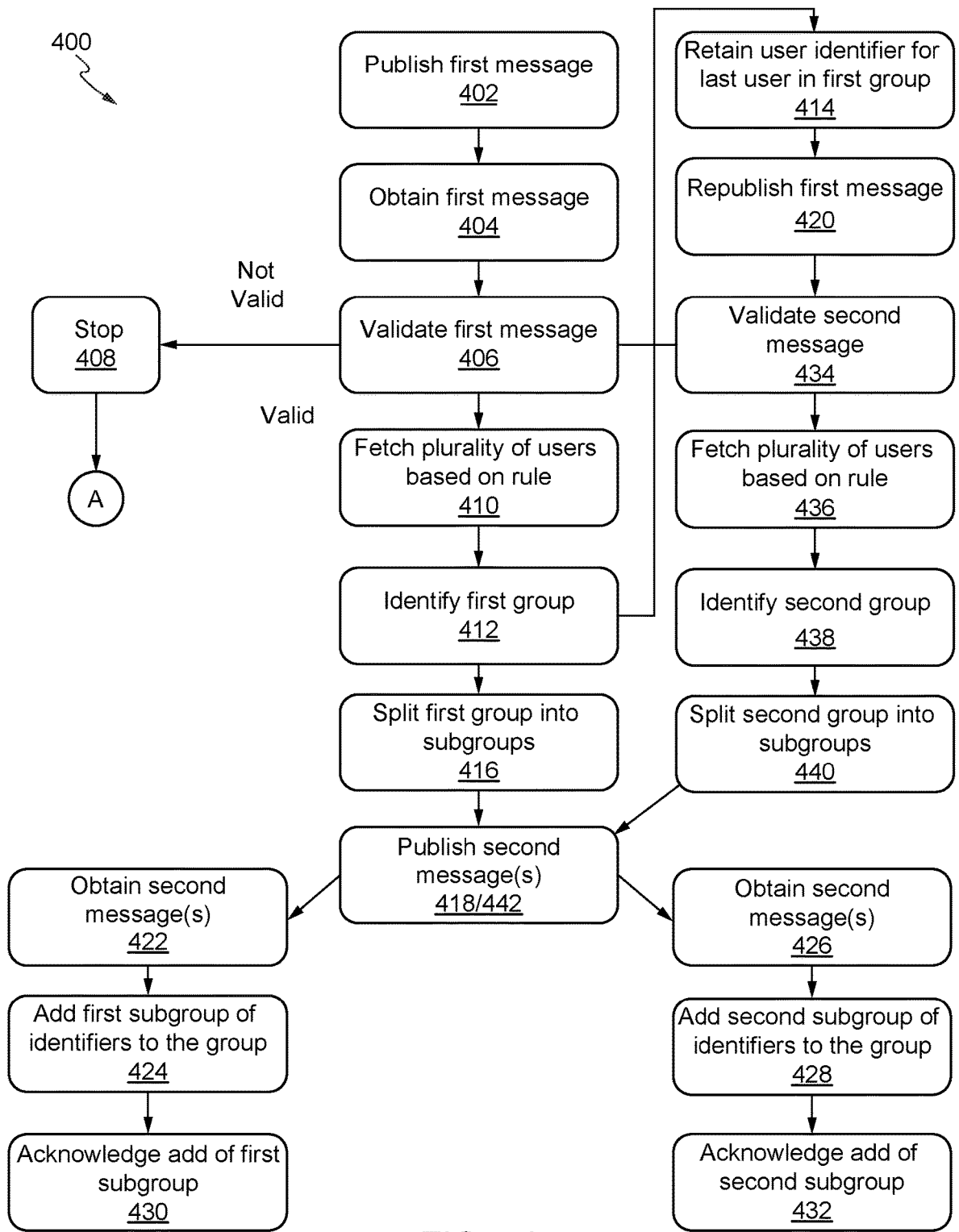
FIGS. 4A and 4B depict a flowchart illustrating a process for lifecycle management in accordance with various embodiments.
Figure 4B:
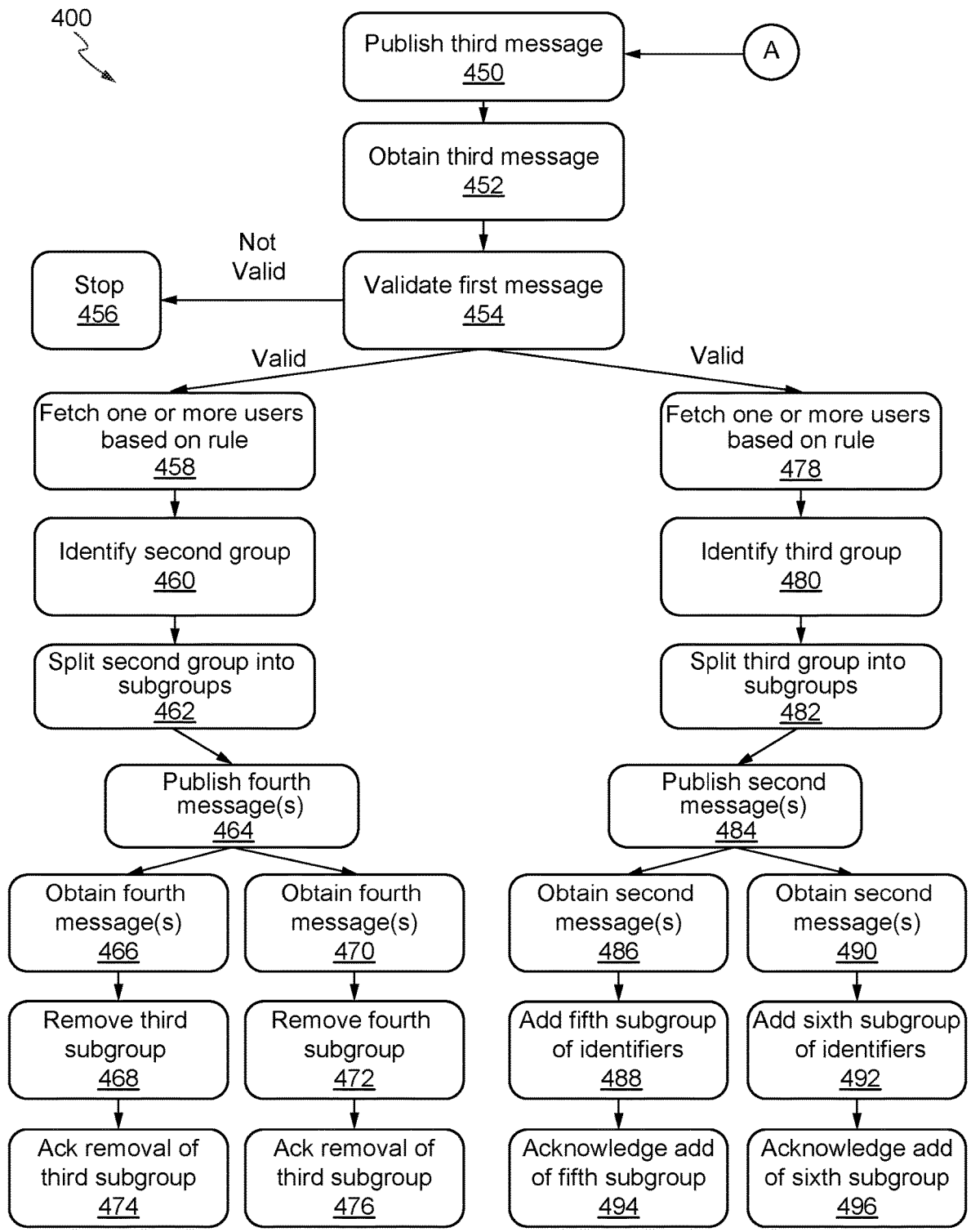

FIGS. 4A and 4B illustrate processes and operations for creating and updating a group and adding users to the group using publication/subscription service (e.g., the publication/subscription service 150 described with respect to FIG. 1). Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes and/or operations depicted in FIGS. 4A and 4B may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIGS. 4A and 4B is not intended to be limiting. Other sequences of steps may also be performed according to alternative embodiments. For example, in alternative embodiments the steps outlined above may be performed in a different order. Moreover, the individual steps illustrated in FIGS. 4A and 4B may include multiple sub-steps that may be performed in various sequences as appropriate to the individual step. Furthermore, additional steps may be added or removed depending on the particular applications. One of ordinary skill in the art would recognize many variations, modifications, and alternatives.

FIGS. 4A and 4B show a flowchart 400 that illustrates a process for creating and updating a group and adding users to the group using publication/subscription service. In some embodiments, the processes depicted in flowchart 400 may be implemented by the architecture and techniques described with respect to FIGS. 1, 2 and 3. As shown in FIG. 4A, at step 402, a first message for a first type of event is published at a data processing system (e.g., a tenant or queue of the data processing system). The first type of event may comprise a request to identify and fetch users for a group based on a rule. At step 404, the first message is obtained by a first subscriber of the data processing system. At step 406, upon obtaining the first message, the first the subscriber validates the rule for the group. In some instances, the validating comprises determining whether the rule has been removed or modified for the group. When the rule has been removed or modified for the group, processing of the first message stops at 408. At step 410, when the rule has not been removed or modified for the group, the first subscriber fetches a plurality of user identifiers associated with a plurality of the users that satisfy the rule. At step 412, the first subscriber identifies a first group of user identifiers of the plurality of user identifiers based on a first configurable property. At step 414, the first subscriber retains a user identifier for the last user in the first group of user identifiers. For example, the first subscriber may store the user identifier for the last user in the first group of user identifiers in a memory storage device or temporary storage such as a cache. At step 416, the first subscriber splits the first group of user identifiers into subgroups of user identifiers based on a second configurable property. In some instances, the subgroups of user identifiers comprise a first subgroup of user identifiers and a second subgroup of user identifiers.

At step 418, the first subscriber publishes a second message for a second type of event for each subgroup of the first group of user identifiers. The second type of event may comprise a request to add the subgroup of user identifiers to the group. At step 420, the first subscriber republishes the first message for the first type of event. The first message is republished with the user identifier for the last user in the first group of user identifiers to maintain state for processing of additional groups of user identifiers. At step 422, a second subscriber obtains the second message for the first subgroup of user identifiers. In some instances, the second subscriber is configured with two or more threads and able to process multiple second messages in parallel (simultaneously) or sequentially. Thus, the second subscriber may further obtain the second message for a third subgroup of user identifiers. At step 424, the second subscriber adds the first subgroup (and optionally the third group of user identifiers) to the group to assign group membership to a first subgroup of the users (and optionally third subgroup of users) associated with the first subgroup of user identifiers (and optionally third subgroup of user identifiers). At step 426, a third subscriber obtains the second message for the second subgroup of user identifiers. At step 428, the third subscriber adds the first subgroup of user identifiers to the group to assign group membership to a first subgroup of the users associated with the first subgroup of user identifiers. In certain instances, the second and third subscriber are different subscribers. At steps 430 and 432, the second and third subscriber provide information or acknowledgment to the publisher that the first subgroup, the second group (and optionally the third group) of user identifiers have been added to the group.

At step 434, upon obtaining the republished first message, a fourth subscriber validates the rule for the group. In some instances, the validating comprises determining whether the rule has been removed or modified for the group. When the rule has been removed or modified for the group, processing of the first message stops at 408. At step 436, when the rule has not been removed or modified for the group, the fourth subscriber fetches the plurality of user identifiers associated with the plurality of the users that satisfy the rule. At step 438, the fourth subscriber identifies a second group of user identifiers of the plurality of user identifiers based on the first configurable property and the user identifier for the last user in the first group of user identifiers. At step 440, the fourth subscriber splits the second group of user identifiers into subgroups of user identifiers based on the second configurable property. At step 442, the fourth subscriber publishes the second message for the second type of event for each subgroup of the second group of user identifiers. The second type of event may comprise a request to add the subgroup of user identifiers to the group. At step 444, the process continues at steps 422 and 426. The process shown in FIG. 4A continues until all groups of user identifiers of the plurality of user identifiers are processed and added to the group or until the rule becomes invalid.

As shown in FIG. 4B, at step 450, a third message for a third type of event is published at a data processing system (e.g., a tenant or queue of the data processing system). The third type of event may comprise a request to identify and fetch users for a group based on a new rule. This step may be triggered by a failed validation step or may be initiated by the publisher without consideration of a failed validation. At step 452, the third message is obtained by a fifth subscriber. At step 454, upon obtaining the third message, the fifth subscriber validates the rule for the group. In some instances, the validating comprises determining whether the rule has been removed or modified for the group. When the rule has been removed or modified for the group, processing of the third message stops at 456. At step 458, when the rule has not been removed or modified for the group, the fifth subscriber fetches one or more user identifiers associated with one or more users that have been assigned group membership to the group that do not satisfy the new rule. At step 460, the fifth subscriber identifies a second group of user identifiers of the one or more user identifiers based on the first configurable property, At step 462, the fifth subscriber splits the second group of user identifiers into subgroups of user identifiers based on the second configurable property. The subgroups of user identifiers may comprise a third subgroup of user identifiers and a fourth subgroup of user identifiers. At step 464, the fifth subscriber publishes a fourth message for a fourth type of event for each subgroup of the second group of user identifiers. In some instances, the fourth type of event comprises a request to remove the subgroup of user identifiers from the group. At step 466, a sixth subscriber obtains the fourth message for the third subgroup of user identifiers. At step 468, the sixth subscriber removes the third subgroup of user identifiers from the group to remove assignment of group membership from a third subgroup of the one or more users associated with the third subgroup of user identifiers. At step 470, the seventh subscriber obtains the fourth message for the third subgroup of user identifiers. At step 472, the seventh subscriber removes the fourth subgroup of user identifiers from the group to remove assignment of group membership from a fourth subgroup of the one or more users associated with the fourth subgroup of user identifiers. At steps 474 and 476, the sixth and seventh subscriber provide information or acknowledgment to the publisher that the third subgroup and fourth subgroup of user identifiers have been added to the group.

At step 478, the fifth subscriber fetches one or more user identifiers associated with one or more users that satisfy the new rule. At step 480, the fifth subscriber identifies a third group of user identifiers of the one or more user identifiers based on the first configurable property. At step 482, the fifth subscriber splits the third group of user identifiers into subgroups of user identifiers based on the second configurable property. In some instances, the subgroups of user identifiers comprise a fifth subgroup of user identifiers and a sixth subgroup of user identifiers. At step 484, the fifth subscriber publishes the second message for the second type of event for each subgroup of the third group of user identifiers. At step 486, the eighth subscriber obtains the second message for the fifth subgroup of user identifiers. At step 488, the eighth subscriber adds the fifth subgroup of user identifiers to the group to assign group membership to a fifth subgroup of the users associated with the fifth subgroup of user identifiers. At step 490, the ninth subscriber obtains the second message for the sixth subgroup of user identifiers. At step 492, the ninth subscriber adds the sixth subgroup of user identifiers to the group to assign group membership to a sixth subgroup of the users associated with the sixth subgroup of user identifiers. At steps 494 and 496, the eighth and ninth subscriber provide information or acknowledgment to the publisher that the fifth subgroup and sixth subgroup of user identifiers have been added to the group.

The techniques described above and below may be implemented in a number of ways and in a number of contexts. Several example implementations and contexts are provided with reference to ordinal numerical identifiers for various components such as first message, first subscriber, second subscriber, third subscriber, etc., as described above and below in more detail. However, the ordinal numerical identifiers (first, second, third, fourth, etc.) are not meant to be limiting on the referenced components. For example, the ordinal numerical identifiers should not be interpreted to mean that a first component and a second component could not be interpreted to be the same component nor should a first component and a second component be interpreted to mean that the first component comes first in a process and the second component comes second in the process. Instead, the ordinal numerical identifiers are being provided merely for an easier understanding of components within the systems and techniques that have the same name or context but may or may not have the save functionality.

Illustrative Systems

Figure 5:
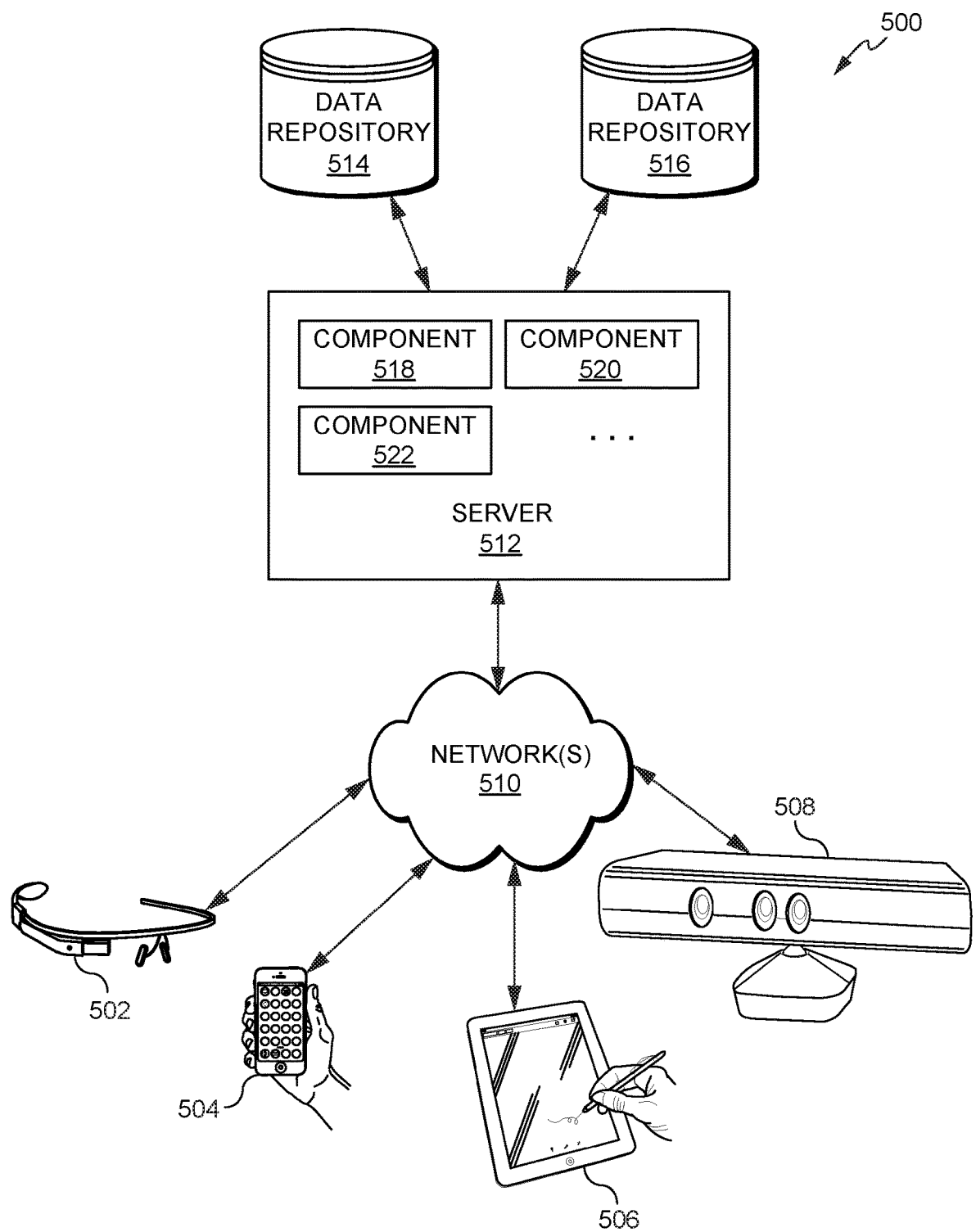
FIG. 5 depicts a simplified diagram of a distributed system for implementing various embodiments.

FIG. 5 depicts a simplified diagram of a distributed system 500 for implementing an embodiment. In the illustrated embodiment, distributed system 500 includes one or more client computing devices 502, 504, 506, and 508, coupled to a server 512 via one or more communication networks 510. Clients computing devices 502, 504, 506, and 508 may be configured to execute one or more applications.

In various embodiments, server 512 may be adapted to run one or more services or software applications that enable performing universal identity management or governance over a wide variety of applications.

In certain embodiments, server 512 may also provide other services or software applications that can include non-virtual and virtual environments. In some embodiments, these services may be offered as web-based or cloud services, such as under a Software as a Service (SaaS) model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in FIG. 5, server 512 may include one or more components 518, 520 and 522 that implement the functions performed by server 512. These components may include software components that may be executed by one or more processors, hardware components, or combinations thereof. It should be appreciated that various different system configurations are possible, which may be different from distributed system 500. The embodiment shown in FIG. 5 is thus one example of a distributed system for implementing an embodiment system and is not intended to be limiting.

Users may use client computing devices 502, 504, 506, and/or 508 to perform universal identity management or governance over a wide variety of applications in accordance with the teachings of this disclosure. A client device may provide an interface that enables a user of the client device to interact with the client device. The client device may also output information to the user via this interface. Although FIG. 5 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 510 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 510 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics Engineers (IEEE) 1002.11 suite of protocols, Bluetooth®, and/or any other wireless protocol), and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 512 can include one or more virtual machines running virtual operating systems, or other computing architectures involving virtualization such as one or more flexible pools of logical storage devices that can be virtualized to maintain virtual storage devices for the server. In various embodiments, server 512 may be adapted to run one or more services or software applications that provide the functionality described in the foregoing disclosure.

The computing systems in server 512 may run one or more operating systems including any of those discussed above, as well as any commercially available server operating system. Server 512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 512 may include one or more applications to analyze and consolidate data feeds and/or event updates received from users of client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 512 may also include one or more applications to display the data feeds and/or real-time events via one or more display devices of client computing devices 502, 504, 506, and 508.

Distributed system 500 may also include one or more data repositories 514, 516. These data repositories may be used to store data and other information in certain embodiments. For example, one or more of the data repositories 514, 516 may be used to store information for performing universal identity management or governance. Data repositories 514, 516 may reside in a variety of locations. For example, a data repository used by server 512 may be local to server 512 or may be remote from server 512 and in communication with server 512 via a network-based or dedicated connection. Data repositories 514, 516 may be of different types. In certain embodiments, a data repository used by server 512 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 514, 516 may also be used by applications to store application data. The data repositories used by applications may be of different types such as, for example, a key-value store repository, an object store repository, or a general storage repository supported by a file system.

Figure 6:
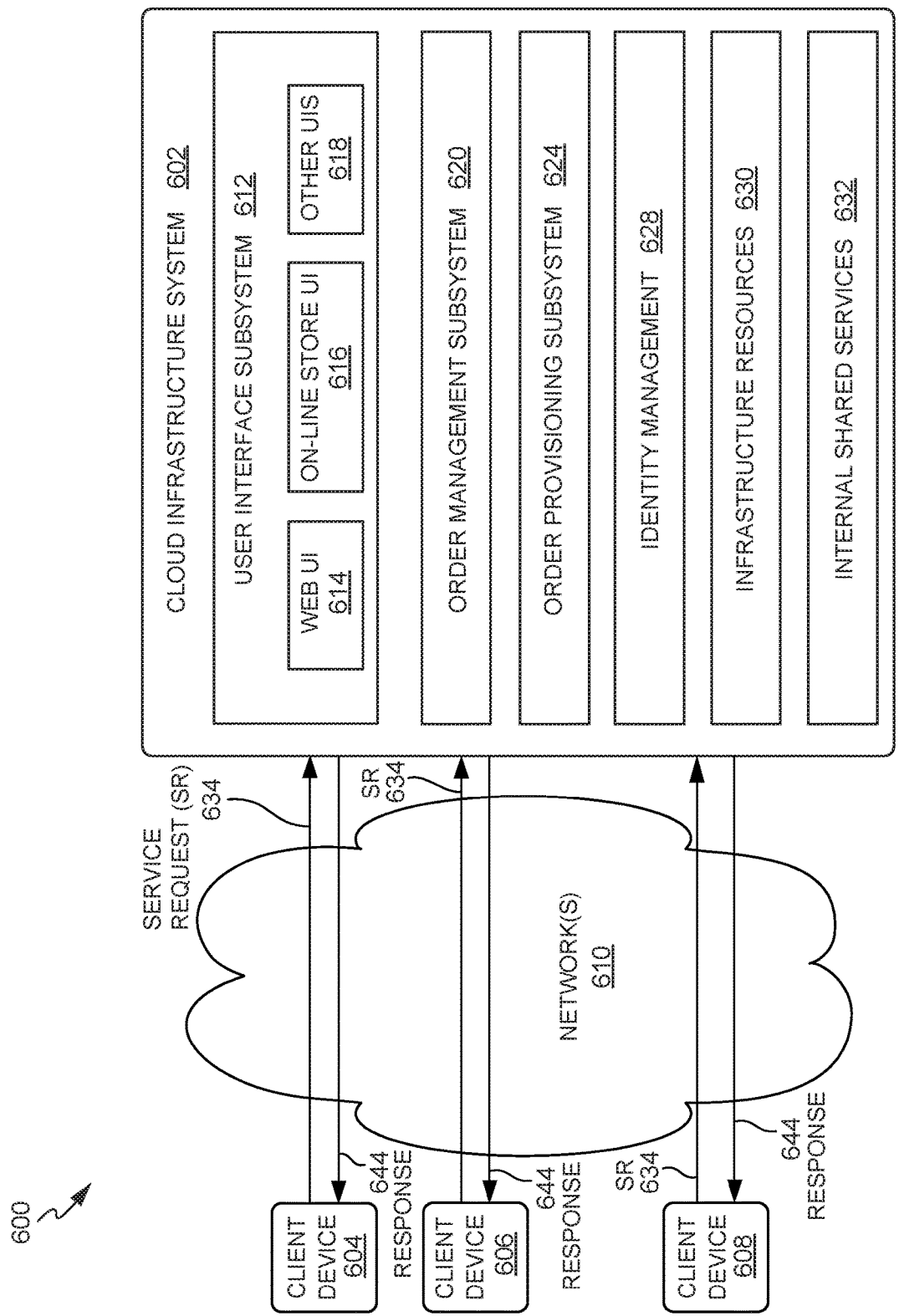
FIG. 6 is a simplified block diagram of one or more components of a system environment by which services provided by one or more components of an embodiment system may be offered as cloud services, in accordance with various embodiments.

In certain embodiments, the performing universal identity management or governance over a wide variety of applications described in this disclosure may be offered as services via a cloud environment. FIG. 6 is a simplified block diagram of a cloud-based system environment in which the performing universal identity management or governance may be offered as cloud services, in accordance with certain embodiments. In the embodiment depicted in FIG. 6, cloud infrastructure system 602 may provide one or more cloud services that may be requested by users using one or more client computing devices 604, 606, and 608. Cloud infrastructure system 602 may comprise one or more computers and/or servers that may include those described above for server 512. The computers in cloud infrastructure system 602 may be organized as general purpose computers, specialized server computers, server farms, server clusters, or any other appropriate arrangement and/or combination.

Network(s) 610 may facilitate communication and exchange of data between clients 604, 606, and 608 and cloud infrastructure system 602. Network(s) 610 may include one or more networks. The networks may be of the same or different types. Network(s) 610 may support one or more communication protocols, including wired and/or wireless protocols, for facilitating the communications.

The embodiment depicted in FIG. 6 is only one example of a cloud infrastructure system and is not intended to be limiting. It should be appreciated that, in some other embodiments, cloud infrastructure system 602 may have more or fewer components than those depicted in FIG. 6, may combine two or more components, or may have a different configuration or arrangement of components. For example, although FIG. 6 depicts three client computing devices, any number of client computing devices may be supported in alternative embodiments.

The term cloud service is generally used to refer to a service that is made available to users on demand and via a communication network such as the Internet by systems (e.g., cloud infrastructure system 602) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 602 may provide one or more cloud services using different models such as under a Software as a Service (SaaS) model, a Platform as a Service (PaaS) model, an Infrastructure as a Service (IaaS) model, and others, including hybrid service models. Cloud infrastructure system 602 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 602. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 602. Cloud infrastructure system 602 then performs processing to provide the services requested in the customer's subscription order. For example, performing universal identity management or governance over a wide variety of applications. Cloud infrastructure system 602 may be configured to provide one or even multiple cloud services.

Cloud infrastructure system 602 may provide the cloud services via different deployment models. In a public cloud model, cloud infrastructure system 602 may be owned by a third party cloud services provider and the cloud services are offered to any general public customer, where the customer can be an individual or an enterprise. In certain other embodiments, under a private cloud model, cloud infrastructure system 602 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 602 and the services provided may be shared by several organizations in a related community. Various other models such as hybrids of the above mentioned models may also be used.

Client computing devices 604, 606, and 608 may be of different types (such as devices 502, 504, 506, and 508 depicted in FIG. 5) and may be capable of operating one or more client applications. A user may use a client device to interact with cloud infrastructure system 602, such as to request a service provided by cloud infrastructure system 602. For example, a user may use a client device to perform universal identity management or governance described in this disclosure.

In some embodiments, the processing performed by cloud infrastructure system 602 for providing universal identity management or governance may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 602 for performing universal identity management or governance over a wide variety of applications. The data used for this analysis may include structured data (e.g., data stored in a database or structured according to a structured model) and/or unstructured data (e.g., data blobs (binary large objects)).

As depicted in the embodiment in FIG. 6, cloud infrastructure system 602 may include infrastructure resources 630 that are utilized for facilitating the provision of various cloud services offered by cloud infrastructure system 602. Infrastructure resources 630 may include, for example, processing resources, storage or memory resources, networking resources, and the like.

In certain embodiments, to facilitate efficient provisioning of these resources for supporting the various cloud services provided by cloud infrastructure system 602 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 602 may itself internally use services 632 that are shared by different components of cloud infrastructure system 602 and which facilitate the provisioning of services by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 602 may comprise multiple subsystems. These subsystems may be implemented in software, or hardware, or combinations thereof. As depicted in FIG. 6, the subsystems may include a user interface subsystem 612 that enables users or customers of cloud infrastructure system 602 to interact with cloud infrastructure system 602. User interface subsystem 612 may include various different interfaces such as a web interface 614, an online store interface 616 where cloud services provided by cloud infrastructure system 602 are advertised and are purchasable by a consumer, and other interfaces 618. For example, a customer may, using a client device, request (service request 634) one or more services provided by cloud infrastructure system 602 using one or more of interfaces 614, 616, and 618. For example, a customer may access the online store, browse cloud services offered by cloud infrastructure system 602, and place a subscription order for one or more services offered by cloud infrastructure system 602 that the customer wishes to subscribe to. The service request may include information identifying the customer and one or more services that the customer desires to subscribe to. For example, a customer may place a subscription order for universal identity management or governance service offered by cloud infrastructure system 602. As part of the order, the customer may provide information identifying complex and time-sensitive business scenarios to be solved.

In certain embodiments, such as the embodiment depicted in FIG. 6, cloud infrastructure system 602 may comprise an order management subsystem (OMS) 620 that is configured to process the new order. As part of this processing, OMS 620 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 620 may then invoke the order provisioning subsystem (OPS) 624 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 624 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 602 may send a response or notification 644 to the requesting customer to indicate when the requested service is now ready for use. In some instances, information (e.g., a link) may be sent to the customer that enables the customer to start using and availing the benefits of the requested services. In certain embodiments, for a customer requesting a universal identity management or governance service, the response may include a request for adding users to one or more groups.

Cloud infrastructure system 602 may provide services to multiple customers. For each customer, cloud infrastructure system 602 is responsible for managing information related to one or more subscription orders received from the customer, maintaining customer data related to the orders, and providing the requested services to the customer. Cloud infrastructure system 602 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 602 may provide services to multiple customers in parallel. Cloud infrastructure system 602 may store information for these customers, including possibly proprietary information. In certain embodiments, cloud infrastructure system 602 comprises an identity management subsystem (IMS) 628 that is configured to manage customers information and provide the separation of the managed information such that information related to one customer is not accessible by another customer. IMS 628 may be configured to provide various security-related services such as identity services, such as information access management, authentication and authorization services, services for managing customer identities and roles and related capabilities, and the like.

Figure 7:
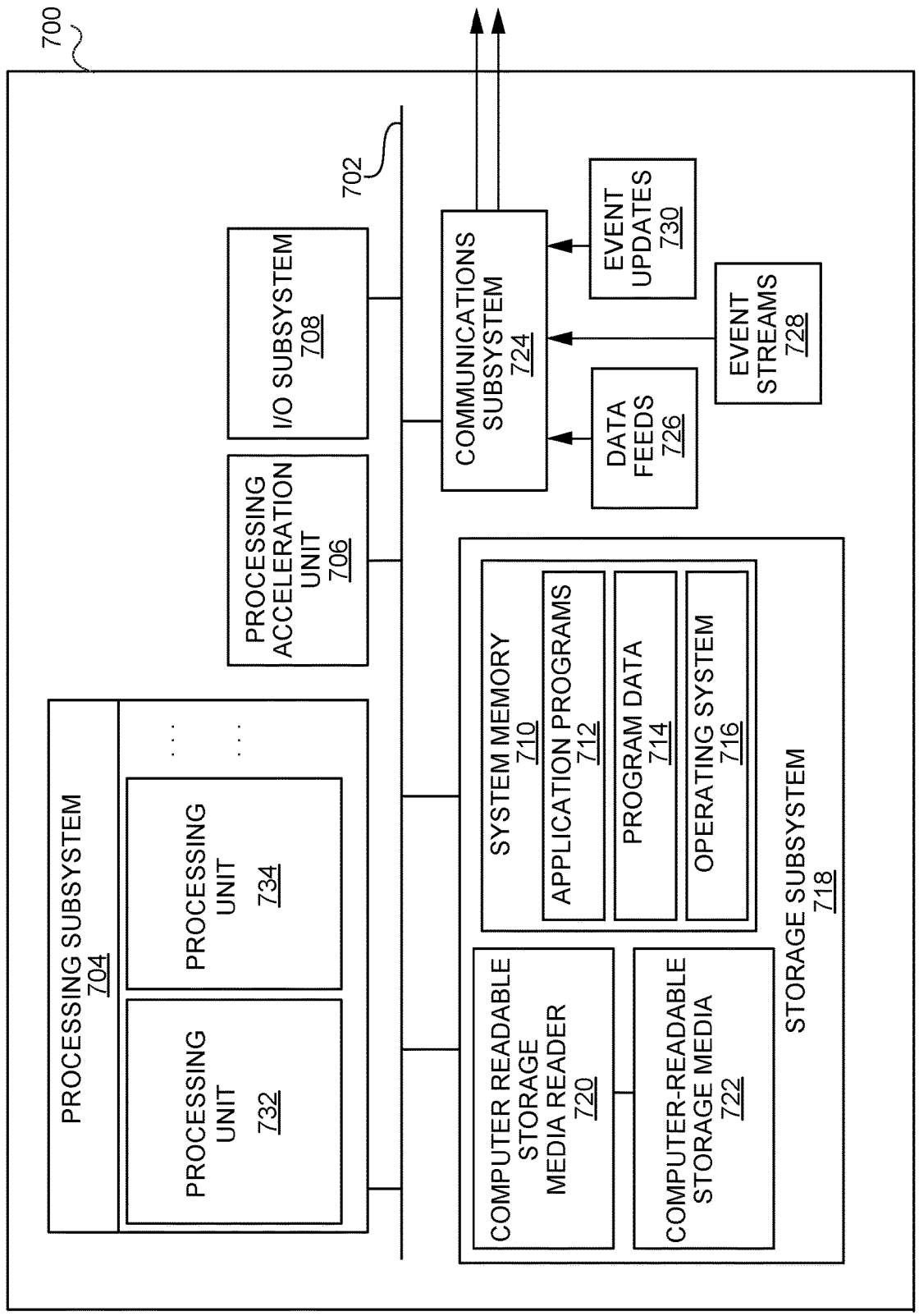
FIG. 7 illustrates an example computer system that may be used to implement various embodiments.

FIG. 7 illustrates an exemplary computer system 700 that may be used to implement certain embodiments. For example, in some embodiments, computer system 700 may be used to implement any of the universal identity management or governance processing systems, identity management systems, and various servers and computer systems described above. As shown in FIG. 7, computer system 700 includes various subsystems including a processing subsystem 704 that communicates with a number of other subsystems via a bus subsystem 702. These other subsystems may include a processing acceleration unit 706, an I/O subsystem 708, a storage subsystem 718, and a communications subsystem 724. Storage subsystem 718 may include non-transitory computer-readable storage media including storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 704 controls the operation of computer system 700 and may comprise one or more processors, application specific integrated circuits (ASICs), or field programmable gate arrays (FPGAs). The processors may include be single core or multicore processors. The processing resources of computer system 700 can be organized into one or more processing units 732, 734, etc. A processing unit may include one or more processors, one or more cores from the same or different processors, a combination of cores and processors, or other combinations of cores and processors. In some embodiments, processing subsystem 704 can include one or more special purpose co-processors such as graphics processors, digital signal processors (DSPs), or the like. In some embodiments, some or all of the processing units of processing subsystem 704 can be implemented using customized circuits, such as application specific integrated circuits (ASICs), or field programmable gate arrays (FPGAs).

In some embodiments, the processing units in processing subsystem 704 can execute instructions stored in system memory 710 or on computer readable storage media 722. In various embodiments, the processing units can execute a variety of programs or code instructions and can maintain multiple concurrently executing programs or processes. At any given time, some or all of the program code to be executed can be resident in system memory 710 and/or on computer-readable storage media 722 including potentially on one or more storage devices. Through suitable programming, processing subsystem 704 can provide various functionalities described above. In instances where computer system 700 is executing one or more virtual machines, one or more processing units may be allocated to each virtual machine.

In certain embodiments, a processing acceleration unit 706 may optionally be provided for performing customized processing or for off-loading some of the processing performed by processing subsystem 704 so as to accelerate the overall processing performed by computer system 700.

I/O subsystem 708 may include devices and mechanisms for inputting information to computer system 700 and/or for outputting information from or via computer system 700. In general, use of the term input device is intended to include all possible types of devices and mechanisms for inputting information to computer system 700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 700 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 718 provides a repository or data store for storing information and data that is used by computer system 700. Storage subsystem 718 provides a tangible non-transitory computer-readable storage medium for storing the basic programming and data constructs that provide the functionality of some embodiments. Storage subsystem 718 may store software (e.g., programs, code modules, instructions) that when executed by processing subsystem 704 provides the functionality described above. The software may be executed by one or more processing units of processing subsystem 704. Storage subsystem 718 may also provide a repository for storing data used in accordance with the teachings of this disclosure.

Storage subsystem 718 may include one or more non-transitory memory devices, including volatile and non-volatile memory devices. As shown in FIG. 7, storage subsystem 718 includes a system memory 710 and a computer-readable storage media 722. System memory 710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 700, such as during start-up, may typically be stored in the ROM. The RAM typically contains data and/or program modules that are presently being operated and executed by processing subsystem 704. In some implementations, system memory 710 may include multiple different types of memory, such as static random access memory (SRAM), dynamic random access memory (DRAM), and the like.

By way of example, and not limitation, as depicted in FIG. 7, system memory 710 may load application programs 712 that are being executed, which may include various applications such as Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 722 may store programming and data constructs that provide the functionality of some embodiments. Computer-readable media 722 may provide storage of computer-readable instructions, data structures, program modules, and other data for computer system 700. Software (programs, code modules, instructions) that, when executed by processing subsystem 704 provides the functionality described above, may be stored in storage subsystem 718. By way of example, computer-readable storage media 722 may include non-volatile memory such as a hard disk drive, a magnetic disk drive, an optical disk drive such as a CD ROM, DVD, a Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 718 may also include a computer-readable storage media reader 720 that can further be connected to computer-readable storage media 722. Reader 720 may receive and be configured to read data from a memory device such as a disk, a flash drive, etc.

In certain embodiments, computer system 700 may support virtualization technologies, including but not limited to virtualization of processing and memory resources. For example, computer system 700 may provide support for executing one or more virtual machines. In certain embodiments, computer system 700 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 700. Accordingly, multiple operating systems may potentially be run concurrently by computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to establish a communication channel to one or more client devices via the Internet for receiving and sending information from and to the client devices. For example, the communication subsystem may be used to obtain a schema for performing universal identity management or governance over a wide variety of applications.

Communication subsystem 724 may support both wired and/or wireless communication protocols. For example, in certain embodiments, communications subsystem 724 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

Communication subsystem 724 can receive and transmit data in various forms. For example, in some embodiments, in addition to other forms, communications subsystem 724 may receive input communications in the form of structured and/or unstructured data feeds 726, event streams 728, event updates 730, and the like. For example, communications subsystem 724 may be configured to receive (or send) data feeds 726 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 724 may be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to communicate data from computer system 700 to other computer systems or networks. The data may be communicated in various different forms such as structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 700 depicted in FIG. 7 is intended only as a specific example. Many other configurations having more or fewer components than the system depicted in FIG. 7 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
   publishing, at a data processing system, a first message for a first type of event, wherein the first type of event comprises a request to identify and fetch users for a group based on a rule;
   obtaining, by a first subscriber of the data processing system, the first message;
   upon obtaining the first message, validating, by the first the subscriber, the rule for the group, wherein the validating comprises determining whether the rule has been removed or modified for the group;
   upon determining the rule has not been removed or modified for the group, fetching, by the first subscriber of the data processing system, a plurality of user identifiers associated with a plurality of the users that satisfy the rule;
   identifying, by the first subscriber of the data processing system, a first group of user identifiers of the plurality of user identifiers based on a first configurable property, wherein the first configurable property is a threshold of user identifiers or users to be processed for a group add operation;
   splitting, by the first subscriber of the data processing system, the first group of user identifiers into subgroups of user identifiers based on a second configurable property, wherein the subgroups of user identifiers comprise a first subgroup of user identifiers and a second subgroup of user identifiers, and wherein the second configurable property is a threshold of the user identifiers or the users to be processed for the group add event to be processed on each thread;
   publishing, by the first subscriber of the data processing system, a second message for a second type of event for each subgroup of the first group of user identifiers, wherein the second type of event comprises a request to add the subgroup of user identifiers to the group;
   obtaining, by a second subscriber of the data processing system, the second message for the first subgroup of user identifiers;
   adding, by a second subscriber of the data processing system, the first subgroup of user identifiers to the group to assign group membership to a first subgroup of the users associated with the first subgroup of user identifiers;
   obtaining, by a third subscriber of the data processing system, the second message for the second subgroup of user identifiers; and
   adding, by a third subscriber of the data processing system, the second subgroup of user identifiers to the group to assign group membership to a second subgroup of the users associated with the second subgroup of user identifiers.

2. The method of claim 1, further comprising:
   obtaining, by the second subscriber of the data processing system, the second message; and
   adding, by the second subscriber of the data processing system, a third subgroup of user identifiers to the group to assign group membership to a third subgroup of the users associated with the third subgroup of user identifiers,
   wherein the adding the first subgroup of user identifiers to the group and the adding the second subgroup of user identifiers to the group are performed simultaneously or serially.

3. The method of claim 1, further comprising:
   retaining, by the first subscriber of the data processing system, a user identifier for the last user in the first group of user identifiers;
   republishing, by the first subscriber of the data processing system, the first message for the first type of event, wherein the first message is republished with the user identifier for the last user in the first group of user identifiers to maintain state for processing of additional groups of user identifiers; and
   obtaining, by a fourth subscriber of the data processing system, the first message, wherein the fourth subscriber is a same or different subscriber as the first subscriber.

4. The method of claim 3, further comprising
   upon determining the rule has been removed or modified for the group, stopping processing of the first message.

5. The method of claim 3, further comprising:
   when the rule has not been removed or modified for the group, fetching, by the fourth subscriber of the data processing system, a plurality of user identifiers associated with a plurality of the users that satisfy the rule;
   identifying, by the fourth subscriber of the data processing system, a second group of user identifiers of the plurality of user identifiers based on the first configurable property and the user identifier for the last user in the first group of user identifiers;
   splitting, by the fourth subscriber of the data processing system, the second group of user identifiers into subgroups of user identifiers based on the second configurable property; and publishing, by the fourth subscriber of the data processing system, the second message for the second type of event for each subgroup of the second group of user identifiers.

6. The method of claim 4, further comprising:
publishing, at the data processing system, a third message for a third type of event, wherein the third type of event comprises a request to identify and fetch users for the group that are not already part of the group based on a new rule;
obtaining, by a fifth subscriber of the data processing system, the third message;
fetching, by the fifth subscriber of the data processing system, one or more user identifiers associated with one or more users that have been assigned group membership to the group that do not satisfy the new rule;
identifying, by the fifth subscriber of the data processing system, a second group of user identifiers of the one or more user identifiers based on the first configurable property;
splitting, by the fifth subscriber of the data processing system, the second group of user identifiers into subgroups of user identifiers based on the second configurable property, wherein the subgroups of user identifiers comprise a third subgroup of user identifiers and a fourth subgroup of user identifiers;
publishing, by the fifth subscriber of the data processing system, a fourth message for a fourth type of event for each subgroup of the second group of user identifiers, wherein the fourth type of event comprises a request to remove the subgroup of user identifiers from the group;
obtaining, by a sixth subscriber of the data processing system, the fourth message for the third subgroup of user identifiers;
removing, by the sixth subscriber of the data processing system, the third subgroup of user identifiers from the group to remove assignment of group membership from a third subgroup of the one or more users associated with the third subgroup of user identifiers;
obtaining, by a seventh subscriber of the data processing system, the fourth message for the fourth subgroup of user identifiers; and
removing, by the seventh subscriber of the data processing system, the fourth subgroup of user identifiers from the group to remove assignment of group membership from a fourth subgroup of the one or more users associated with the fourth subgroup of user identifiers.

7. The method of claim 6, further comprising:
fetching, by the fifth subscriber of the data processing system, a one or more user identifiers associated with one or more users that satisfy the new rule;
identifying, by the fifth subscriber of the data processing system, a third group of user identifiers of the one or more user identifiers based on the first configurable property;
splitting, by the fifth subscriber of the data processing system, the third group of user identifiers into subgroups of user identifiers based on the second configurable property, wherein the subgroups of user identifiers comprise a fifth subgroup of user identifiers and a sixth subgroup of user identifiers;
publishing, by the fifth subscriber of the data processing system, the second message for the second type of event for each subgroup of the third group of user identifiers;
obtaining, by a eighth subscriber of the data processing system, the second message for the fifth subgroup of user identifiers;
adding, by a eighth subscriber of the data processing system, the fifth subgroup of user identifiers to the group to assign group membership to a fifth subgroup of the users associated with the fifth subgroup of user identifiers;
obtaining, by a ninth subscriber of the data processing system, the second message for the sixth subgroup of user identifiers; and
adding, by the ninth subscriber of the data processing system, the sixth subgroup of user identifiers to the group to assign group membership to a sixth subgroup of the users associated with the sixth subgroup of user identifiers.

8. A non-transitory computer-readable memory storing a plurality of instructions executable by one or more processors, the plurality of instructions comprising instructions that when executed by the one or more processors cause the one or more processors to perform processing comprising:
publishing, at a data processing system, a first message for a first type of event, wherein the first type of event comprises a request to identify and fetch users for a group based on a rule;
obtaining, by a first subscriber of the data processing system, the first message;
upon obtaining the first message, validating, by the first the subscriber, the rule for the group, wherein the validating comprises determining whether the rule has been removed or modified for the group;
upon determining the rule has not been removed or modified for the group, fetching, by the first subscriber of the data processing system, a plurality of user identifiers associated with a plurality of the users that satisfy the rule;
identifying, by the first subscriber of the data processing system, a first group of user identifiers of the plurality of user identifiers based on a first configurable property, wherein the first configurable property is a threshold of user identifiers or users to be processed for a group add operation;
splitting, by the first subscriber of the data processing system, the first group of user identifiers into subgroups of user identifiers based on a second configurable property, wherein the subgroups of user identifiers comprise a first subgroup of user identifiers and a second subgroup of user identifiers, and wherein the second configurable property is a threshold of the user identifiers or the users to be processed for the group add event to be processed on each thread;
publishing, by the first subscriber of the data processing system, a second message for a second type of event for each subgroup of the first group of user identifiers, wherein the second type of event comprises a request to add the subgroup of user identifiers to the group;
obtaining, by a second subscriber of the data processing system, the second message for the first subgroup of user identifiers;
adding, by a second subscriber of the data processing system, the first subgroup of user identifiers to the group to assign group membership to a first subgroup of the users associated with the first subgroup of user identifiers;
obtaining, by a third subscriber of the data processing system, the second message for the second subgroup of user identifiers; and adding, by a third subscriber of the data processing system, the second subgroup of user identifiers to the group to assign group membership to a second subgroup of the users associated with the second subgroup of user identifiers.

9. The non-transitory computer-readable memory of claim 8, wherein the processing further comprises:
   obtaining, by the second subscriber of the data processing system, the second message; and
   adding, by the second subscriber of the data processing system, a third subgroup of user identifiers to the group to assign group membership to a third subgroup of the users associated with the third subgroup of user identifiers,
   wherein the adding the first subgroup of user identifiers to the group and the adding the second subgroup of user identifiers to the group are performed simultaneously or serially.

10. The non-transitory computer-readable memory of claim 8, wherein the processing further comprises:
    retaining, by the first subscriber of the data processing system, a user identifier for the last user in the first group of user identifiers;
    republishing, by the first subscriber of the data processing system, the first message for the first type of event, wherein the first message is republished with the user identifier for the last user in the first group of user identifiers to maintain state for processing of additional groups of user identifiers; and
    obtaining, by a fourth subscriber of the data processing system, the first message, wherein the fourth subscriber is a same or different subscriber as the first subscriber.

11. The non-transitory computer-readable memory of claim 10, wherein the processing further comprises
    upon determining the rule has been removed or modified for the group, stopping processing of the first message.

12. The non-transitory computer-readable memory of claim 10, wherein the processing further comprises:
    when the rule has not been removed or modified for the group, fetching, by the fourth subscriber of the data processing system, a plurality of user identifiers associated with a plurality of the users that satisfy the rule;
    identifying, by the fourth subscriber of the data processing system, a second group of user identifiers of the plurality of user identifiers based on the first configurable property and the user identifier for the last user in the first group of user identifiers;
    splitting, by the fourth subscriber of the data processing system, the second group of user identifiers into subgroups of user identifiers based on the second configurable property; and
    publishing, by the fourth subscriber of the data processing system, the second message for the second type of event for each subgroup of the second group of user identifiers.

13. The non-transitory computer-readable memory of claim 11, wherein the processing further comprises:
    publishing, at the data processing system, a third message for a third type of event, wherein the third type of event comprises a request to identify and fetch users for the group that are not already part of the group based on a new rule;
    obtaining, by a fifth subscriber of the data processing system, the third message;
    fetching, by the fifth subscriber of the data processing system, one or more user identifiers associated with one or more users that have been assigned group membership to the group that do not satisfy the new rule;
    identifying, by the fifth subscriber of the data processing system, a second group of user identifiers of the one or more user identifiers based on the first configurable property;
    splitting, by the fifth subscriber of the data processing system, the second group of user identifiers into subgroups of user identifiers based on the second configurable property, wherein the subgroups of user identifiers comprise a third subgroup of user identifiers and a fourth subgroup of user identifiers;
    publishing, by the fifth subscriber of the data processing system, a fourth message for a fourth type of event for each subgroup of the second group of user identifiers, wherein the fourth type of event comprises a request to remove the subgroup of user identifiers from the group;
    obtaining, by a sixth subscriber of the data processing system, the fourth message for the third subgroup of user identifiers;
    removing, by the sixth subscriber of the data processing system, the third subgroup of user identifiers from the group to remove assignment of group membership from a third subgroup of the one or more users associated with the third subgroup of user identifiers;
    obtaining, by a seventh subscriber of the data processing system, the fourth message for the fourth subgroup of user identifiers; and
    removing, by the seventh subscriber of the data processing system, the fourth subgroup of user identifiers from the group to remove assignment of group membership from a fourth subgroup of the one or more users associated with the fourth subgroup of user identifiers.

14. The non-transitory computer-readable memory of claim 13, wherein the processing further comprises:
    fetching, by the fifth subscriber of the data processing system, a one or more user identifiers associated with one or more users that satisfy the new rule;
    identifying, by the fifth subscriber of the data processing system, a third group of user identifiers of the one or more user identifiers based on the first configurable property;
    splitting, by the fifth subscriber of the data processing system, the third group of user identifiers into subgroups of user identifiers based on the second configurable property, wherein the subgroups of user identifiers comprise a fifth subgroup of user identifiers and a sixth subgroup of user identifiers;
    publishing, by the fifth subscriber of the data processing system, the second message for the second type of event for each subgroup of the third group of user identifiers;
    obtaining, by a eighth subscriber of the data processing system, the second message for the fifth subgroup of user identifiers;
    adding, by a eighth subscriber of the data processing system, the fifth subgroup of user identifiers to the group to assign group membership to a fifth subgroup of the users associated with the fifth subgroup of user identifiers;
    obtaining, by a ninth subscriber of the data processing system, the second message for the sixth subgroup of user identifiers; and
    adding, by the ninth subscriber of the data processing system, the sixth subgroup of user identifiers to the group to assign group membership to a sixth subgroup of the users associated with the sixth subgroup of user identifiers.

15. A system comprising:
one or more processors; and
a memory coupled to the one or more processors, the memory storing a plurality of instructions executable by the one or more processors, the plurality of instructions comprising instructions that when executed by the one or more processors cause the one or more processors to perform processing comprising:
publishing, at a data processing system, a first message for a first type of event, wherein the first type of event comprises a request to identify and fetch users for a group based on a rule;
obtaining, by a first subscriber of the data processing system, the first message;
upon obtaining the first message, validating, by the first the subscriber, the rule for the group, wherein the validating comprises determining whether the rule has been removed or modified for the group;
upon determining the rule has not been removed or modified for the group, fetching, by the first subscriber of the data processing system, a plurality of user identifiers associated with a plurality of the users that satisfy the rule;
identifying, by the first subscriber of the data processing system, a first group of user identifiers of the plurality of user identifiers based on a first configurable property, wherein the first configurable property is a threshold of user identifiers or users to be processed for a group add operation;
splitting, by the first subscriber of the data processing system, the first group of user identifiers into subgroups of user identifiers based on a second configurable property, wherein the subgroups of user identifiers comprise a first subgroup of user identifiers and a second subgroup of user identifiers, and wherein the second configurable property is a threshold of the user identifiers or the users to be processed for the group add event to be processed on each thread;
publishing, by the first subscriber of the data processing system, a second message for a second type of event for each subgroup of the first group of user identifiers, wherein the second type of event comprises a request to add the subgroup of user identifiers to the group;
obtaining, by a second subscriber of the data processing system, the second message for the first subgroup of user identifiers;
adding, by a second subscriber of the data processing system, the first subgroup of user identifiers to the group to assign group membership to a first subgroup of the users associated with the first subgroup of user identifiers;
obtaining, by a third subscriber of the data processing system, the second message for the second subgroup of user identifiers; and
adding, by a third subscriber of the data processing system, the second subgroup of user identifiers to the group to assign group membership to a second subgroup of the users associated with the second subgroup of user identifiers.

16. The system of claim 15, wherein the processing further comprises:
retaining, by the first subscriber of the data processing system, a user identifier for the last user in the first group of user identifiers;
republishing, by the first subscriber of the data processing system, the first message for the first type of event, wherein the first message is republished with the user identifier for the last user in the first group of user identifiers to maintain state for processing of additional groups of user identifiers; and
obtaining, by a fourth subscriber of the data processing system, the first message, wherein the fourth subscriber is a same or different subscriber as the first subscriber.

17. The system of claim 16, wherein the processing further comprises
upon determining the rule has been removed or modified for the group, stopping processing of the first message.

18. The system of claim 16, wherein the processing further comprises:
when the rule has not been removed or modified for the group, fetching, by the fourth subscriber of the data processing system, a plurality of user identifiers associated with a plurality of the users that satisfy the rule;
identifying, by the fourth subscriber of the data processing system, a second group of user identifiers of the plurality of user identifiers based on the first configurable property and the user identifier for the last user in the first group of user identifiers;
splitting, by the fourth subscriber of the data processing system, the second group of user identifiers into subgroups of user identifiers based on the second configurable property; and
publishing, by the fourth subscriber of the data processing system, the second message for the second type of event for each subgroup of the second group of user identifiers.

19. The system of claim 17, wherein the processing further comprises:
publishing, at the data processing system, a third message for a third type of event, wherein the third type of event comprises a request to identify and fetch users for the group that are not already part of the group based on a new rule;
obtaining, by a fifth subscriber of the data processing system, the third message;
fetching, by the fifth subscriber of the data processing system, one or more user identifiers associated with one or more users that have been assigned group membership to the group that do not satisfy the new rule;
identifying, by the fifth subscriber of the data processing system, a second group of user identifiers of the one or more user identifiers based on the first configurable property;
splitting, by the fifth subscriber of the data processing system, the second group of user identifiers into subgroups of user identifiers based on the second configurable property, wherein the subgroups of user identifiers comprise a third subgroup of user identifiers and a fourth subgroup of user identifiers;
publishing, by the fifth subscriber of the data processing system, a fourth message for a fourth type of event for each subgroup of the second group of user identifiers, wherein the fourth type of event comprises a request to remove the subgroup of user identifiers from the group;
obtaining, by a sixth subscriber of the data processing system, the fourth message for the third subgroup of user identifiers;
removing, by the sixth subscriber of the data processing system, the third subgroup of user identifiers from the group to remove assignment of group membership from a third subgroup of the one or more users associated with the third subgroup of user identifiers;

obtaining, by a seventh subscriber of the data processing system, the fourth message for the fourth subgroup of user identifiers; and removing, by the seventh subscriber of the data processing system, the fourth subgroup of user identifiers from the group to remove assignment of group membership from a fourth subgroup of the one or more users associated with the fourth subgroup of user identifiers.

20. The system of claim 19, wherein the processing further comprises:

fetching, by the fifth subscriber of the data processing system, a one or more user identifiers associated with one or more users that satisfy the new rule;

identifying, by the fifth subscriber of the data processing system, a third group of user identifiers of the one or more user identifiers based on the first configurable property;

splitting, by the fifth subscriber of the data processing system, the third group of user identifiers into subgroups of user identifiers based on the second configurable property, wherein the subgroups of user identifiers comprise a fifth subgroup of user identifiers and a sixth subgroup of user identifiers;

publishing, by the fifth subscriber of the data processing system, the second message for the second type of event for each subgroup of the third group of user identifiers;

obtaining, by an eighth subscriber of the data processing system, the second message for the fifth subgroup of user identifiers;

adding, by an eighth subscriber of the data processing system, the fifth subgroup of user identifiers to the group to assign group membership to a fifth subgroup of the users associated with the fifth subgroup of user identifiers;

obtaining, by a ninth subscriber of the data processing system, the second message for the sixth subgroup of user identifiers; and adding, by the ninth subscriber of the data processing system, the sixth subgroup of user identifiers to the group to assign group membership to a sixth subgroup of the users associated with the sixth subgroup of user identifiers.

* * * * *

UNITED STATES PATENT AND TRADEMARK OFFICE
CERTIFICATE OF CORRECTION

| | |
|---|---|
| PATENT NO. | : 11,303,646 B2 |
| APPLICATION NO. | : 16/820424 |
| DATED | : April 12, 2022 |
| INVENTOR(S) | : Chawla et al. |

It is certified that error appears in the above-identified patent and that said Letters Patent is hereby corrected as shown below:

In the Specification

In Column 18, Line 19, delete "the the" and insert -- the --, therefor.

In Column 24, Line 31, delete "the the" and insert -- the --, therefor.

In Column 28, Line 55, delete "Mobile" and insert -- Mobile®, --, therefor.

In Column 29, Line 15, delete "infra-red" and insert -- infrared --, therefor.

In Column 37, Line 58, delete "(e.g.," and insert -- e.g., --, therefor.

In the Claims

In Column 39, Line 49, in Claim 1, delete "the subscriber," and insert -- subscriber, --, therefor.

In Column 42, Line 29, in Claim 8, delete "the subscriber," and insert -- subscriber, --, therefor.

In Column 45, Line 19, in Claim 15, delete "the subscriber," and insert -- subscriber, --, therefor.

Signed and Sealed this
Sixteenth Day of August, 2022

Katherine Kelly Vidal
*Director of the United States Patent and Trademark Office*